United States Patent
Tian et al.

(10) Patent No.: US 12,455,266 B1
(45) Date of Patent: Oct. 28, 2025

(54) METHODS FOR DETECTING AUSTENITIC WELD BASED ON ULTRASONIC-MAGNETIC COMBINATION TECHNIQUE

(71) Applicant: HULUDAO BEIJIAN TECHNOLOGY CO., LTD., Liaoning (CN)

(72) Inventors: Sen Tian, Huludao (CN); Guoliang Tian, Huludao (CN); Luoyao Zhu, Huludao (CN); Lingxuan Jiang, Huludao (CN); Yufeng Miao, Huludao (CN); Xinran Zhang, Huludao (CN)

(73) Assignee: HOLUDAO BEIJIAN TECHNOLOGY CO., LTD., Huludao (CN)

( * ) Notice: Subject to any disclaimer, the term of this patent is extended or adjusted under 35 U.S.C. 154(b) by 0 days.

(21) Appl. No.: 19/178,976

(22) Filed: Apr. 15, 2025

(30) Foreign Application Priority Data

Apr. 15, 2024 (CN) .......................... 202410447934.3

(51) Int. Cl.
*G01N 29/26* (2006.01)
*G01N 29/04* (2006.01)
(Continued)

(52) U.S. Cl.
CPC ......... *G01N 29/262* (2013.01); *G01N 29/043* (2013.01); *G01N 29/069* (2013.01); *G01N 29/2412* (2013.01); *G01N 2291/2675* (2013.01)

(58) Field of Classification Search
CPC .. G01N 29/262; G01N 29/043; G01N 29/069; G01N 29/2412; G01N 2291/2675
(Continued)

(56) References Cited

U.S. PATENT DOCUMENTS

| | | | | | |
|---|---|---|---|---|---|
| 5,474,225 | A | * | 12/1995 | Geier | ..................... B23K 31/12 228/5.7 |
| 5,619,423 | A | * | 4/1997 | Scrantz | .............. G01N 29/4463 324/229 |

(Continued)

FOREIGN PATENT DOCUMENTS

| | | |
|---|---|---|
| CN | 109521084 A | 3/2019 |
| CN | 110261476 A | 9/2019 |

(Continued)

OTHER PUBLICATIONS

The Second Office Action in Chinese Application No. 202410447934.3 mailed on Jun. 12, 2024, 15 pages.
(Continued)

*Primary Examiner* — Jacques M Saint Surin
(74) *Attorney, Agent, or Firm* — Porus IP LLC

(57) ABSTRACT

Disclosed is a method for detecting an austenitic weld based on an ultrasonic-magnetic combination technique, and belongs to the field of non-destructive testing technique, comprising dividing the austenitic weld into a plurality of zones along a thickness direction to obtain divided zones; detecting the divided zones based on phased array ultrasonic testing (PAUT) and weak magnetic detection; and determining priorities of the PAUT and the weak magnetic detection according to a position of each of the zones, a defect type and a position of a zone in which a defect is located. The method integrates the PAUT technique and the weak magnetic detection technique to address issues such as missed detection, incomplete coverage, and the inability to detect defects when using an ultrasonic method for detecting the austenitic weld, thereby providing technical assurance for the application of austenitic stainless steel materials in high-end equipment and large-scale projects.

9 Claims, 30 Drawing Sheets

(51) Int. Cl.
  *G01N 29/06*  (2006.01)
  *G01N 29/24*  (2006.01)
(58) Field of Classification Search
  USPC .......................................................... 73/601
  See application file for complete search history.

(56) References Cited

U.S. PATENT DOCUMENTS

| | | | | |
|---|---|---|---|---|
| 6,373,245 | B1* | 4/2002 | Kwun | G01N 29/2412 |
| | | | | 324/240 |
| 6,896,171 | B2* | 5/2005 | Den Boer | B23K 31/12 |
| | | | | 228/103 |
| 6,920,792 | B2* | 7/2005 | Flora | G01N 29/2412 |
| | | | | 73/622 |
| 2021/0278370 | A1* | 9/2021 | Borigo | G01N 29/265 |
| 2022/0236233 | A1* | 7/2022 | Shinoda | G01N 29/4418 |

FOREIGN PATENT DOCUMENTS

| | | |
|---|---|---|
| CN | 111948279 A | 11/2020 |
| CN | 114577910 A | 6/2022 |
| IN | 201631018536 A * | 12/2017 |
| KR | 102487645 B1 | 1/2023 |

OTHER PUBLICATIONS

Notification to Grant Patent Right for Invention in Chinese Application No. 202410447934.3 mailed on Jul. 10, 2024, 4 pages.

Zhang, Yan et al., Phased Array Ultrasonic Testing Method for Butt Weld of Austenitic Stainless Steel Plate, China Plant Engineering, 2017, 3 pages.

Lin, Jia et al., Study on Phased Array Ultrasonic Examination Technology for T weld joint, Process Equipment & Piping, 54(4): 17-21, 2017.

Gao, Huidong et al., EMAT and its Application in Weld Inspection, Nondestructive Testing, 32(11): 850-853+856, 2010.

Sun, Zhongbo et al., The Process of Ultrasonic Phased Array Inspection on Small Diameter Thin Walled Austenitic Stainless Steel Tube Weld, Nondestructive Testing, 39(5): 24-27&41, 2017.

* cited by examiner

METHODS FOR DETECTING AUSTENITIC WELD BASED ON ULTRASONIC-MAGNETIC COMBINATION TECHNIQUE

CROSS REFERENCE TO RELATED APPLICATIONS

This application claims priority to Chinese Patent Application No. 202410447934.3, filed on Apr. 15, 2024, the contents of which are hereby incorporated by reference.

TECHNICAL FIELD

The present disclosure relates to the field of non-destructive testing technique, and in particular to a method for detecting an austenitic weld based on an ultrasonic-magnetic combination technique.

BACKGROUND

Pressure equipment includes various boilers, pressure vessels, pressure pipelines, and long-distance oil and gas pipelines, etc., which is important production equipment and has a close relationship with national economic production and people's daily life. However, the pressure equipment often being operated under the situation of high temperature, high pressure and/or toxic media. Once an accident occurs, the consequences are extremely serious. In order to avoid possible quality accidents, the non-destructive testing technique is widely applied in the period of manufacturing, service and inspection of the pressure equipment.

Phased array ultrasonic testing (PAUT) technique is the new direction and power for the development of the non-destructive testing technique in China and abroad at present, and it is one of the most advanced non-destructive testing technologies. The PAUT technique is a method of achieving ultrasonic emission and reception by electronically controlling ultrasonic beams of a PAUT probe. A wafer of the PAUT probe consists of a plurality of small wafers each of which is also referred to as an array element. Each array element can be independently excited and applied with different time delays. Ultrasonic waves emitted by all the array elements form an overall wavefront, which can realize dynamic focusing and effective control of the shape and direction of the emitted ultrasonic beams, and provide a greater ability to determine the shape, size, and direction of defects than single or multiple conventional ultrasonic probe systems. The PAUT technique has an imaging function, the testing result is displayed in the form of images and denoted as A-scan, B-scan, S-scan, E-scan, and P-scan, which is intuitive and easy to be understood. The stored data can be dynamically playback, and the scanned position can be recorded also, which cannot be achieved by conventional ultrasonic testing technologies.

Weak magnetic detection is a unique and unconventional detection technique that has emerged in recent years. It is a passive detection technique applied based on a natural geomagnetic field that does not require excitation. That is, a workpiece to be detected is placed in a natural geomagnetic field environment, an internal defect of the workpiece is detected and quantitatively assessed by measuring the magnetic induction intensity on the surface of the material based on a difference of change in the magnetic permeability between the material defect and the material itself. The weak magnetic detection technique is an innovative detection technique with distinctive characteristics. Unlike active detection methods such as radiographic testing, eddy current testing, magnetic particle inspection (MPI), ultrasonic testing (UT), time-of-flight diffraction (TOFD), the PAUT etc., which require the application of external excitation, the weak magnetic detection technique operates without loading detection excitation.

Austenitic stainless steel is currently one of the most widely used materials in high-end applications as it has excellent corrosion resistance and strength. However, the austenitic stainless steel has poor weldability, which is sensitive to welding defects and regional corrosion. The coarse grain structure of the austenitic stainless steel weld makes ultrasonic testing more difficult, which is considered a worldwide technical problem due to the following reasons.

(1) The austenitic stainless steel weld does not undergo phase transformation during the solidification, and retains an as-cast columnar grain structure at room temperature. The coarse grains of the butt weld present an inhomogeneous microstructure with significant anisotropy, which makes ultrasonic testing more difficult.

(2) The growth orientation of the columnar grains in the austenitic stainless steel weld is related to the cooling direction and temperature gradient. In general, the growth orientation of the grains is basically perpendicular to the isotherms during the solidification of the molten metal. In the case of the austenitic stainless steel weld, the growth orientation of the columnar grains are approximately perpendicular to the bevel surface.

(3) The characteristics of the columnar grains are that the same grain will show different sizes when measured from different directions. For example, the diameter of a columnar grain is in a range of 0.1 mm-0.5 mm, while the length of the grain is more than 10 mm. For such grains, the attenuation and signal-to-noise ratio (SNR) differ when detected from different directions. However, where an angle between the ultrasonic beams and the columnar grains is small, the attenuation is low and the SNR is high; and where the beams are perpendicular to the columnar grains, the attenuation is high and the SNR is low, which shown the anisotropy of the attenuation and the SNR.

(4) The austenitic stainless steel weld formed by multiple passes will lead to different grain structures in different parts due to differences in welding processes and specifications. As a result, the sound velocity and acoustic impedance also vary, which causes deviations in the propagation direction of the ultrasonic beams, resulting in bottom wave movement. The bottom wave amplitudes in different parts are significantly different, which makes ultrasonic testing more difficult.

These reasons make the austenitic weld detection a worldwide challenge. At present, the austenitic weld detection mainly adopts radiographic testing, ultrasonic testing, and dye penetrant inspection (DPI). The application of the radiographic testing is limited by the influence of X-ray penetration angle, workpiece thickness, defect opening width, workpiece shape and radiation hazards, which leads to problems of missed detection and incomplete detection coverage, and cannot be widely used. The DPI is only applicable to the detection of the surface opening defect, and cannot be applied to detect the near-surface or interior defect. The magnetic particle inspection (MPI) is not applicable to the austenitic weld detection as the austenitic weld is not magnetic or low magnetic. The ultrasonic testing, especially the PAUT technique, is the most common means for detecting the austenitic weld at present.

At present, many ultrasonic testing standards in China and abroad stipulate austenitic weld detection method. For example, the U.S. standard ASME Boiler and Pressure Vessel Code Volume V, "Non-destructive Testing", is the world's authoritative standards, the China standard NB/T47013.3 "Non-destructive Testing for Pressure Equipment Part 3: Ultrasonic Testing" and NB/T47013.15 "Non-destructive Testing for Pressure Equipment Part 15: Phased Array Ultrasonic Testing (PAUT)" are the authoritative standards for China special equipment industry and the implementation standards designated by the China national administrative regulations with high authority. However, where the said standards are applied to the detection of the austenitic weld in practice, scanning on two surfaces and two sides of the weld shall be carried out, e.g. large-diameter vessel girth weld and large storage tank girth weld etc. If scanning on one surface and two sides of the weld and/or on one surface and one side of the weld, common problems such as missed detection and incomplete coverage of the entire volume of the weld can be encountered. These common problems are mainly inclusive of 1) missed detection of the transverse crack defect in the girth weld of austenitic stainless steel pipe, 2) incomplete detection coverage of the weld surface and near-surface and transverse crack missed detection while detecting the girth weld of a heavy thickness austenitic pipe, and 3) incomplete detection coverage and transverse crack missed detection for fillet welds and T-welds detection. These common problems will lead to low probability of detection, which will weaken the authority of the standards and make the standards low application value. Even with the addition of radiographic testing and DPI, the detection result is not ideal due to the limitation of each detection method, and the said problems cannot be solved to ensure the weld quality and operating safety of the austenitic weld. These problems in ultrasonic testing need to be compensated by the most scientific, universal and unique advanced technique—the weak magnetic detection to achieve the perfect combination.

The weak magnetic detection is a unique and innovative method that can be applied to non-magnetic or low-magnetic austenitic weld detection. It is a special and disruptive technique with many advantages. For instance, the probe does not contact the workpiece while scanning, eliminating the need for the couplant or surface cleaning. Surface conditions of the workpiece such as rust, oil, an anticorrosive coating or cladding do not affect the detection results. In addition, it is suitable for site detection due to no radiation hazards and no mutual interference while cross working. The probe performs detection by moving close to the surface of the weld, which is quite fast and the defects can be shown in the form of images. However, this technique also has obvious shortcomings. For example, two defects with different thicknesses at the same location are easy to be confused, the accuracy of defect depth measurement is low, and a large defect is liable to be displayed as a plurality of defects, geometrical shapes generate interference images which is prone to misjudgment. These limitations need to be addressed using complementary detection methods, especially by the PAUT technique. A geometric interference signal generated by the weak magnetic detection is mainly caused by weld reinforcement. The interference signal generated by cap reinforcement can be identified by visual inspection. The interference signal generated by root reinforcement is difficult to be identified by the weak magnetic detection. Such interference signal detection is precisely where the PAUT technique excels, especially when using primary ultrasonic wave beams, making it easier to be detected.

SUMMARY

The objective of the present disclosure is to provide a method for detecting an austenitic weld based on an ultrasonic-magnetic combination technique to solve the problems of missed detection, incomplete coverage and inability to detect the austenitic weld using ultrasonic methods (including PAUT) in the prior art, which is a disruptive technological innovation and lays a safety and quality foundation for promoting the development of new quality productivity in high-end industries.

In order to achieve the above objective, the present disclosure provides a method for detecting an austenitic weld based on an ultrasonic-magnetic combination technique, comprising:
1. dividing the austenitic weld into a plurality of zones along a thickness direction to obtain divided zones;
2. detecting the divided zones based on the ultrasonic-magnetic combination technique.

The ultrasonic-magnetic combination technique is a combination of PAUT and weak magnetic detection. The PAUT device can provide longitudinal wave scanning and shear wave scanning.

The PAUT device is a multi-channel device with function of providing multiple scanning modes and zone discrimination scanning, as well as exciting no less than 16 wafers at a time. The weak magnetic detection device may have no less than two channels.

Priorities of the PAUT and the weak magnetic detection may be determined according to the location of each divided zone, defect type and its location in a zone. A PAUT device may adopt non-parallel scanning or manual zigzag scanning. The non-parallel scanning detection refers to the scanning detection making the PAUT probe moving direction parallel to the direction of the weld. While non-parallel scanning applied, the PAUT device is provided with encoder. The weak magnetic detection may adopt manual scanning or mechanical scanning provided with the encoder, and make the probe close to the surface of the weld while it is moving parallel to the direction of the weld.

Where encountered non-detectable zone, difficult-to-detect defect, and an acoustic transparency defect during the PAUT scanning, the weak magnetic detection is adopted. All confusion defect signals and geometric interference signals appearing during the weak magnetic detection are identified by the PAUT scanning for recognition. The non-detectable zone during the PAUT scanning is such a zone that can not be detected due to its structural limitation and/or limitations of the applied detection methods. The difficult-to-detect defect during the non-parallel scanning detection or the manual zigzag scanning detection is such a transverse defect that its direction is parallel or approximately parallel to a phased array ultrasonic wave beam. The acoustic transparency defect is such a defect that it's gap is so narrow that ultrasonic waves can penetrate through it without reflection at an interface, which lead to no echo signal is observed and make the defect undetectable. All confusion defect signals and geometric interference signals appearing during the weak magnetic detection, the confusion defect signal includes that two defects with same position but different thicknesses are confused, or a large defect is displayed as a plurality of defects, the geometric interference signal includes that geometrical shapes generate interference image display.

A comprehensive evaluation is performed on a defect detected by both the longitudinal wave scanning and the shear wave scanning of the PAUT.

The method for detecting the austenitic weld based on the ultrasonic-magnetic combination technique is suitable for different types of weld grooves and different welding processes, and the detection of welds of coarse grain materials, composite plates, and carbon steel. The PAUT device can provide both sector scanning detection and linear scanning detection. The PAUT probe may use a linear array probe or an area array probe.

The technical solution of the present disclosure is further described in detail with reference to the accompanying drawings and embodiments.

DETAILED DESCRIPTION

Figure 1:
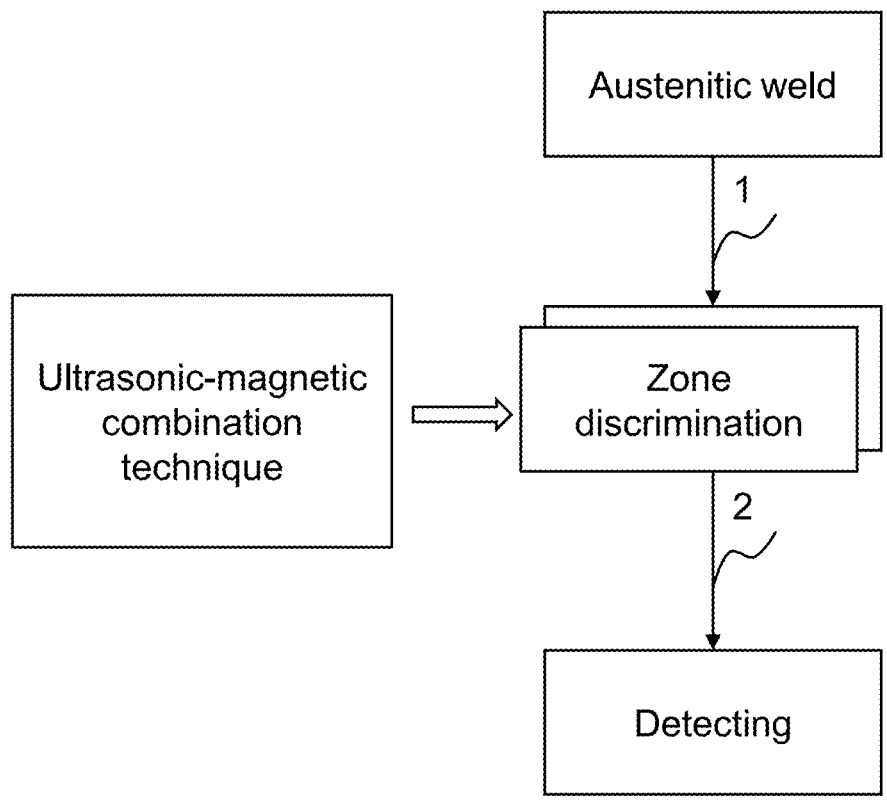
FIG. 1 is a flowchart illustrating an exemplary method for detecting an austenitic weld based on an ultrasonic-magnetic combination technique according to some embodiments of the present disclosure.

FIG. 1 is a flowchart illustrating an exemplary method for detecting an austenitic weld based on an ultrasonic-magnetic combination technique according to some embodiments of the present disclosure. As shown in FIG. 1, a process 100 includes the following operations.

Step 1, an austenitic weld is divided into a plurality of zones along a thickness direction to obtain divided zones.

The austenitic weld refers to a weld with an austenitic structure formed during a welding process. An austenite refers to a structural form of steel at a high temperature. During the welding process, the deposited welding material in the weld and the heat-affected zone are subjected to the high temperature, leading to a phase change and formation of the austenite.

The thickness direction refers to a direction perpendicular to the surface of the austenitic weld, i.e., a direction of the austenitic weld from the surface to the interior of the austenitic weld.

Dividing the austenitic weld into a plurality of zones refer to dividing the austenitic weld into a plurality of zones along the thickness direction for more accurate detection. For example, the austenitic weld is divided into a plurality of zones equally and/or arbitrarily along the thickness direction.

Step 2, the divided zones may be detected based on an ultrasonic-magnetic combination technique.

In some embodiments, the ultrasonic-magnetic combination technique is a combination of PAUT and weak magnetic detection. The PAUT includes longitudinal wave scanning and shear wave scanning.

The shear wave scanning is configured to detect a defect near a fusion line, including lack of side fusion, external toe crack, etc. The longitudinal wave scanning is configured to detect the volumetric defects inside the zones, such as porosity, slag inclusion, centerline crack, etc. A comprehensive evaluation is performed on the defect detected by both the longitudinal wave scanning and the shear wave scanning of the PAUT. In response to a non-detectable zone, a difficult-to-detect defect, and an acoustic transparency defect during the PAUT, the weak magnetic detection is adopted.

In some embodiments, priorities of the PAUT and the weak magnetic detection may be determined according to location of each zone, defect type, and location of a defect within the zone. A PAUT device may adopt non-parallel scanning or manual zigzag scanning for detection. The non-parallel scanning detection refers to the scanning detection making the PAUT probe moving direction parallel to the direction of the weld. While non-parallel scanning applied, the PAUT device is provided with encoder. The weak magnetic detection may adopt manual scanning or mechanical scanning provided with the encoder, and make the probe close to the surface of the weld while it is moving parallel to the direction of the weld.

The location of each zone may be represented based on a corresponding thickness zone. For example, the location of zone 1 corresponds to a thickness zone in a range of 0-20 mm.

The defect type refers to a type of defect presents in the austenitic weld, which includes crack, porosity, slag inclusion, lack of fusion, incomplete penetration, etc.

The location of the zone refers to the position where the defect is located in the zone. For example, the defect is located 10 mm away from the surface of the zone, which is not limited in the present disclosure.

In some embodiments, the priorities of the PAUT and the weak magnetic detection may be determined by the experienced technicians according to the location of each divided zone, defect type and its location in a zone.

In some embodiments, the PAUT device is a multi-channel device with function of providing multiple scanning modes and zone discrimination scanning, as well as exciting no less than 16 wafers at a time. The weak magnetic detection device may have no less than two channels. The count of probe channel is determined based on the workpiece to be detected.

The multi-channel device refers to a device that has a plurality of ultrasonic transmission and reception channels. It may simultaneously excite a plurality of array elements to form a plurality of ultrasonic beams, thereby improving the detection efficiency and resolution.

The multi-scanning function refers to a plurality of scanning modes that the PAUT device can perform, such as sector scanning, linear scanning, spiral scanning, etc.

The zone discrimination scanning function refers to a function of executing scanning and analyzing on zone basis.

In some embodiments of the present disclosure, the PAUT device is a multi-channel device with function of providing multiple scanning modes and zone discrimination scanning, as well as exciting no less than 16 wafers at a time to significantly improve the efficiency and accuracy. The weak magnetic detection device shall have at least two channels, which ensures that high-quality detection effects can be achieved by the PAUT and the weak magnetic detection, thereby effectively improving detection coverage and detection capacity.

In some embodiments, in response to the non-detectable zone, difficult-to-detect defect, and acoustic transparency defect during the PAUT scanning, the weak magnetic detection is adopted. All confusion defect signals and geometric interference signals appearing during the weak magnetic detection are identified by the PAUT scanning for recognition. The non-detectable zone for PAUT scanning is defined as a zone that cannot be detected due to its structural limitation and/or limitations of the applied detection methods. The difficult-to-detect defect during the non-parallel scanning detection or the manual zigzag scanning detection is such a transverse defect that its direction is parallel or approximately parallel to a phased array ultrasonic beam. The acoustic transparency defect is such a defect that it's gap is so narrow that ultrasonic waves can penetrate through the defect without reflection at the interface, which lead to no echo signal is observed and make the defect undetectable. All confusion defect signals and geometric interference signals appearing during the weak magnetic detection, the confusion defect signal includes that two defects with same position but different thicknesses are confused, or a large defect is displayed as a plurality of defects, the geometric interference signal includes that geometrical shapes generate interference image display.

In some embodiments, the confusion defect signals and the geometric interference signals appearing during the weak magnetic detection are identified by the PAUT scanning for recognition.

In some embodiments, the confusion defect signal includes that two defects with same position but different thicknesses are confused, or a large defect is displayed as a plurality of defects; the geometric interference signal includes that geometrical shapes generate interference image display.

In some embodiments, the confusion defect signals may be generated in various situations. For example, it may be generated by such cases as two defects at the same position but with different thicknesses, or a large defect is displayed by several combined defects, etc.

In some embodiments, the geometric interference signal may be generated by various geometrical shapes.

The large defect refers to a defect whose length is greater than a preset size threshold. The preset size threshold is set by those technicians.

In some embodiments of the present disclosure, the combination of the PAUT and the weak magnetic detection is employed to leverage the unique features and advantages of these two detection technologies, thereby achieving comprehensive inspection of the austenitic weld, regardless of the defect type, and addressing challenges associated with detecting defects in the austenitic weld. The inspection of the austenitic weld is conducted by zone discrimination, and the priorities of the PAUT and the weak magnetic detection is determined according to the location of the zone, the defect type, and the location of the defect within the zone. The main features of this detection method are novel and unique, simple and practical in operation, accurate in detection result, high in detection efficiency, low cost, and free of radiation hazards or pollution.

In some embodiments, a comprehensive evaluation is performed on the defect identified by both longitudinal wave scanning and shear wave scanning of the PAUT.

The criteria for the comprehensive evaluation may be determined by those skilled in the art based on practical experience.

In some embodiments of the present disclosure, by the comprehensive evaluation on the data of longitudinal wave scanning and shear wave scanning of the PAUT device, the type and nature of the defect can be more accurately identified and assessed, thereby improving the detection reliability and the comprehensiveness of defect analysis.

In some embodiments, the method for detecting the austenitic weld based on the ultrasonic-magnetic combination technique is applicable to detect the welds of both austenitic coarse grain materials and non-austenitic coarse grain materials, composite plates, and carbon steel.

In some embodiments of the present disclosure, the method for detecting the austenitic weld based on the ultrasonic-magnetic combination technique has a wide range of application. This method is suitable for detecting various weld grooves and different welding processes. The PAUT device can provide both sector scanning detection and linear scanning detection. The PAUT probe may use a linear array probe or an area array probe.

EMBODIMENTS

In order to make the objective, technical solutions and advantages of the present disclosure clearer, the technical solutions in the embodiments will be described clearly and completely below with reference to the attached drawings. It is clear that what the embodiments described are obviously not the whole embodiments but partial of them. Components of the embodiments of the present disclosure generally described and illustrated in the accompanying drawings herein may be arranged and designed in a variety of different configurations.

Embodiment 1

Figure 2:
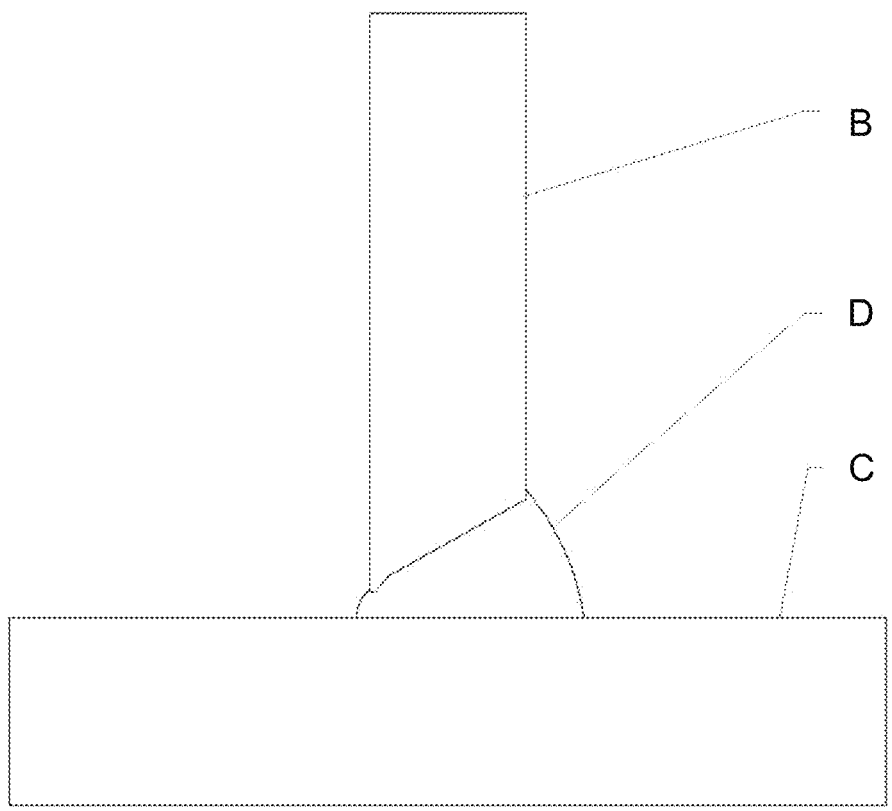
FIG. 2 is a diagram illustrating a configuration for a single bevel T-shaped fillet weld according to Embodiment 1 of the present disclosure.

A single bevel T-shaped fillet weld simulated defect test piece 1 is detected. A T-shaped fillet weld is formed by a material austenite 316L with specifications of 400 mm×400 mm×40 mm and 400 mm×200 mm×40 mm, with a modified single bevel preparation. As shown in FIG. 2, the weld preparation parameters are as follows: the bevel angle in the filling & cap passes is 25°, the bevel angle in the hot & root passes is 45°, the height of the filling zone is 35 mm, the height of the root face is 1.5 mm, the cap reinforcement width is 15 mm, the cap reinforcement height is 25 mm, the root reinforcement width is 6 mm, the root reinforcement height is 7 mm, and the thickness of the workpiece is 40 mm. Five defects are fabricated in the T-shaped fillet weld, i.e., defect 1 #root incomplete penetration, defect 2 #slag inclusion, defect 3 #longitudinal crack, defect 4 #porosity, and defect 5 #lack of side fusion with the parameters shown in Table 1. The simulated defect test piece 1 was fabricated by the welding process of one-side welding with back formation. The scanning surface is B-side, C-side, and D-side, other surfaces cannot be scanned. That is, the detection can only be performed on one surface and one side.

Parameters of simulated defect test piece 1.

TABLE 1

Parameters of simulated defect test piece 1

Figure 10:
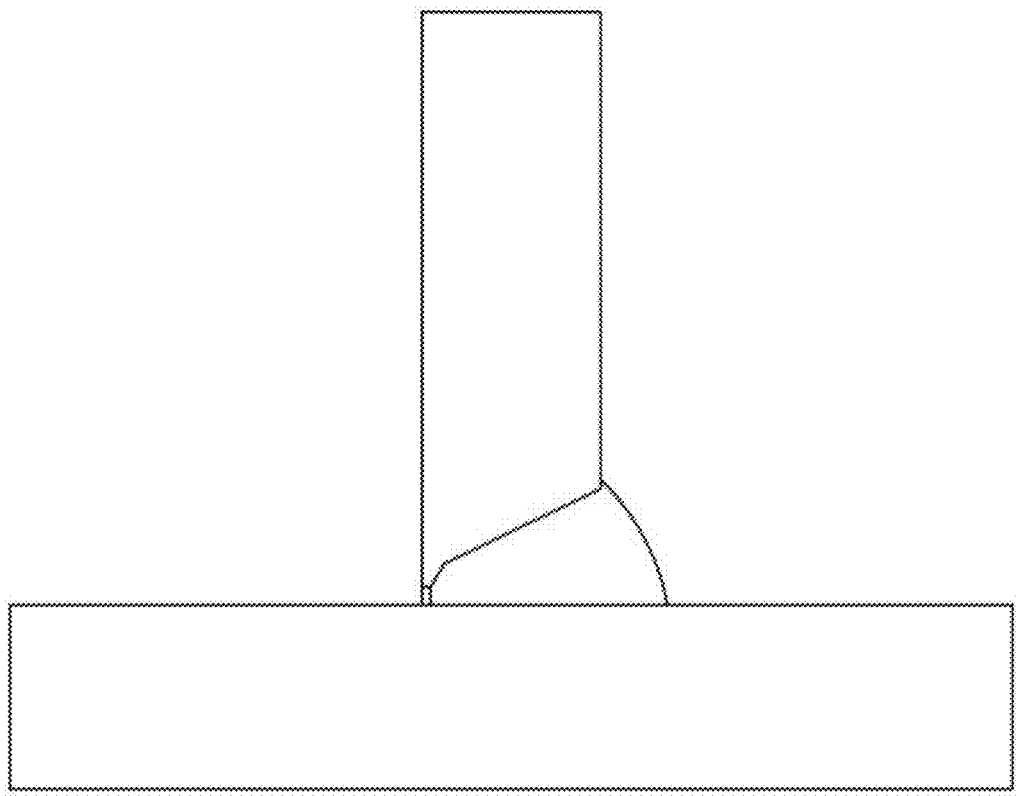
FIG. 10 is a schematic diagram illustrating a design of defect 1 #root incomplete penetration in Embodiment 1.
Figure 11:
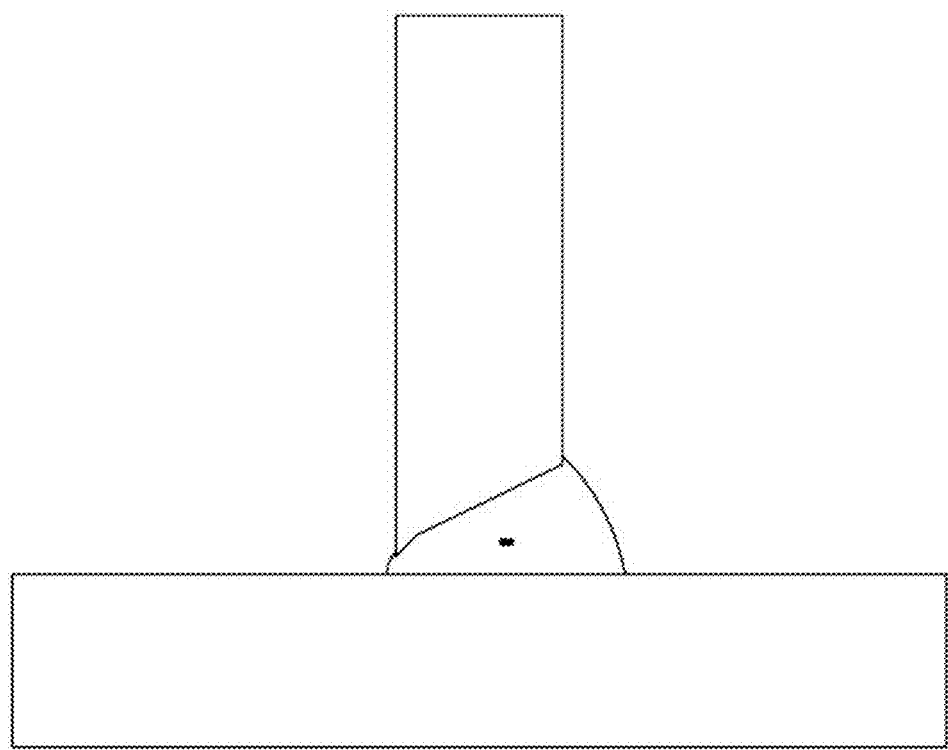
FIG. 11 is a schematic diagram illustrating a design of defect 2 #slag inclusion in Embodiment 1.
Figure 12:
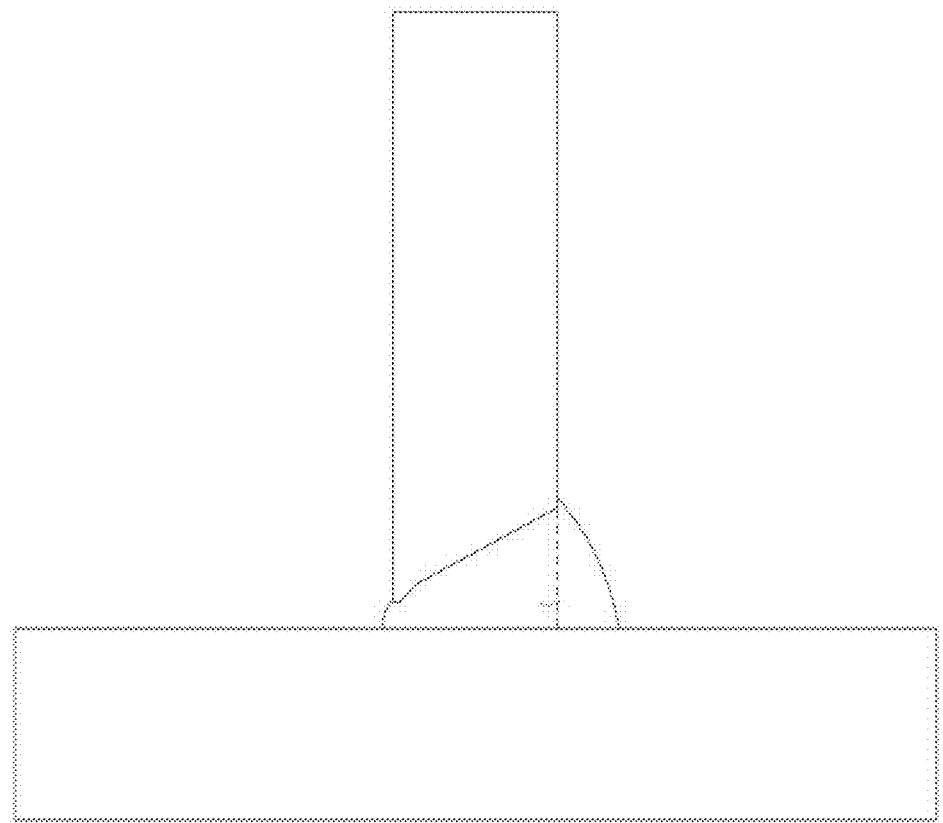
FIG. 12 is a schematic diagram illustrating a design of defect 3 #crack in Embodiment 1.
Figure 13:
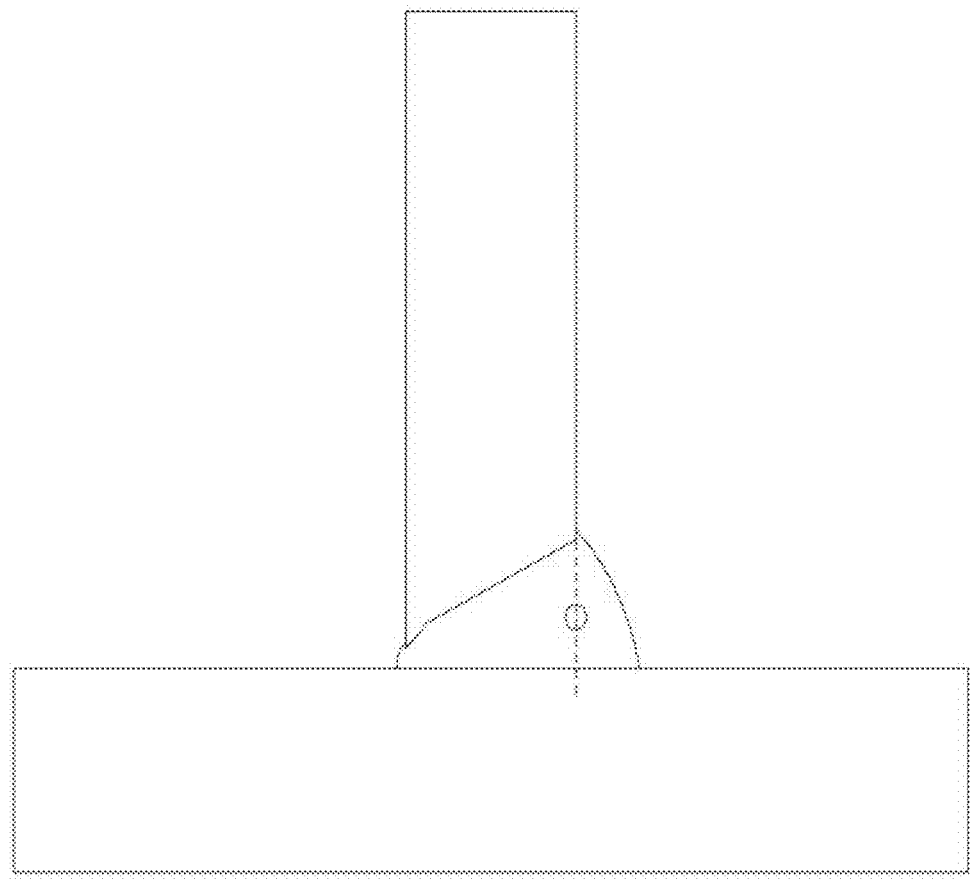
FIG. 13 is a schematic diagram illustrating a design of defect 4 #porosity in Embodiment 1.
Figure 14:
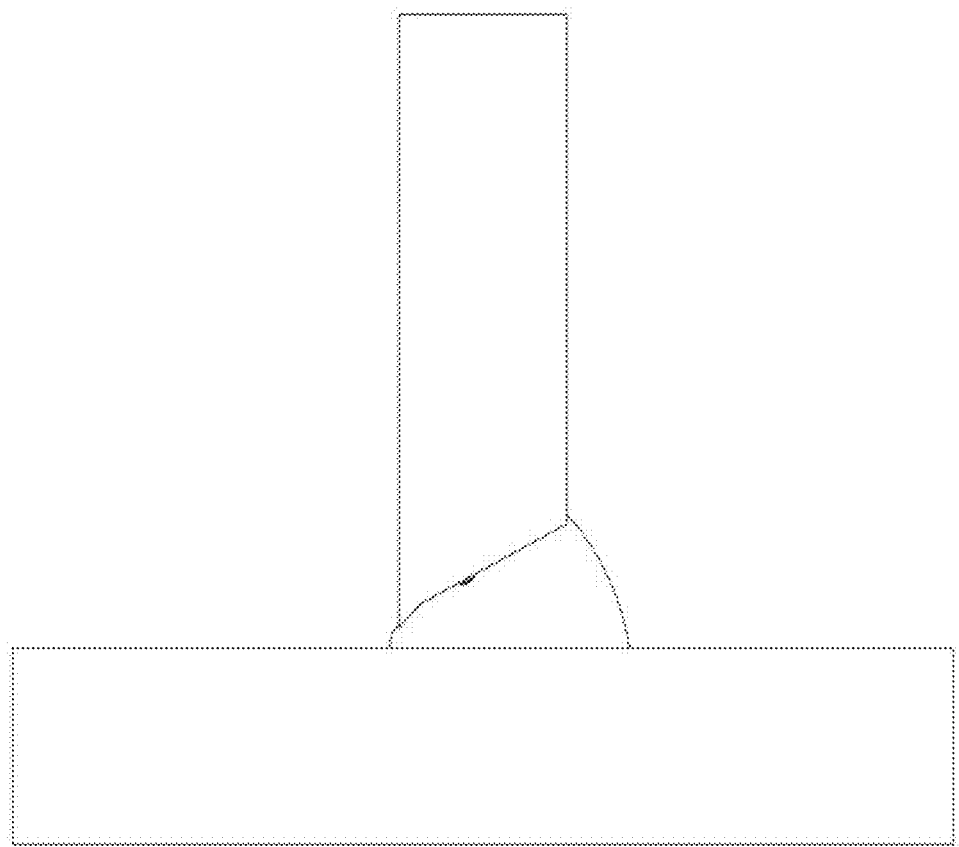
FIG. 14 is a schematic diagram illustrating a design of defect 5 #lack of side fusion in Embodiment 1.

| Specifications (mm) | Defect Code | Nature of defect | Defect position (mm) | Length (error ± 5) | Depth (error ± 1) | Self-height (error ± 1) | Note |
|---|---|---|---|---|---|---|---|
| 400 × 400 × 40 and 400 × 200 × 40 T-shaped fillet weld test piece 1 | 1# | Root incomplete penetration | 30-45 | 15 | 38 | 2 | See FIG. 10 |
| | 2# | Slag inclusion | 112-132 | 20 | 12 | 3 | See FIG. 11 |
| | 3# | Crack | 193-209 | 16 | −1-0-3 | 4 | See FIG. 12 |
| | 4# | Porosity | 283 | Φ 5 | −2.5-0-2.5 | / | See FIG. 13 |
| | 5# | Lack of side fusion | 356-369 | 13 | 22 | 3.5 | See FIG. 14 |

Note:
Depth value is specified as a negative value within the weld reinforcement and a positive value within the workpiece.

Step 1, an inspection approach for a T-shaped fillet weld simulated defect test piece 1 is determined.

The inspection approach for the T-shaped fillet weld simulated defect test piece 1 involves the application of both PAUT and weak magnetic detection. The PAUT employs longitudinal wave scanning and shear wave scanning.

Step 2, Detection devices and probes selection.

1. A PAUT device ISONIC-PA-2009 is selected. Parameters of a phased array probe are as follows.

Figure 3:
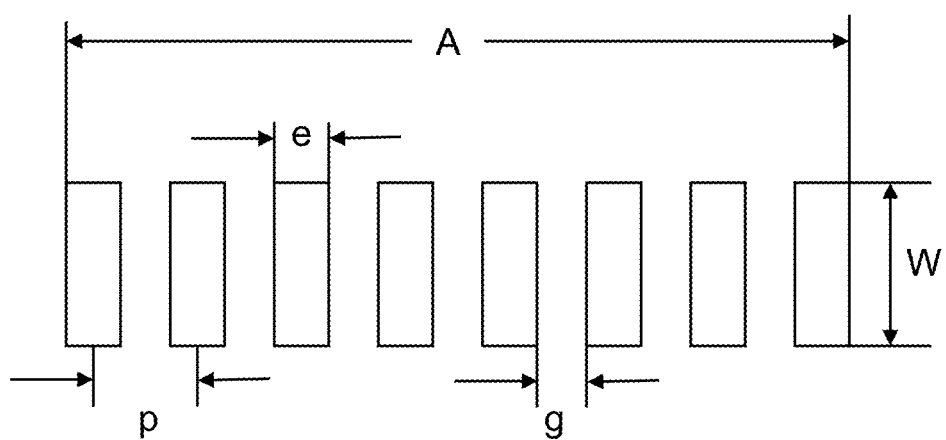
FIG. 3 is a schematic diagram illustrating a wafer parameter of a phased array probe according to Embodiment 1 of the present disclosure.
Figure 4:
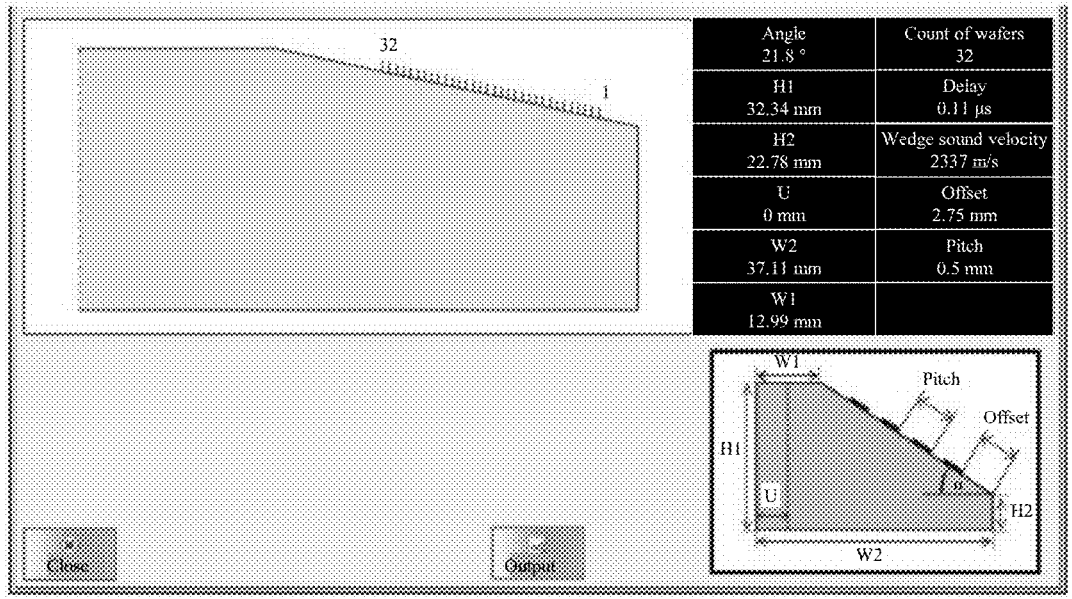
FIG. 4 is a schematic diagram illustrating the geometric parameter of a longitudinal wave probe wedge according to Embodiment 1 of the present disclosure.

(1) Parameters of a phased array longitudinal wave probe: a one-dimensional 32-wafer linear phased array probe is used. As shown in FIG. 3, A denotes an active aperture, g denotes a gap between adjacent wafers, e denotes a width of each wafer, p denotes a centerline spacing of two adjacent wafers, and W denotes a length (i.e., a passive aperture) of each wafer. In this embodiment, e=0.4 mm, g=0.1 mm, p=0.5 mm, W=10 mm, and a count of activation wafers are 32, and a frequency f=5 MHz. An angle of a longitudinal wave wedge is 21.8°, and geometrical parameters are shown in FIG. 4.

The active aperture refers to a zone of the wafer within the phased array probe that is actually used for transmitting and receiving ultrasonic waves.

Figure 5:
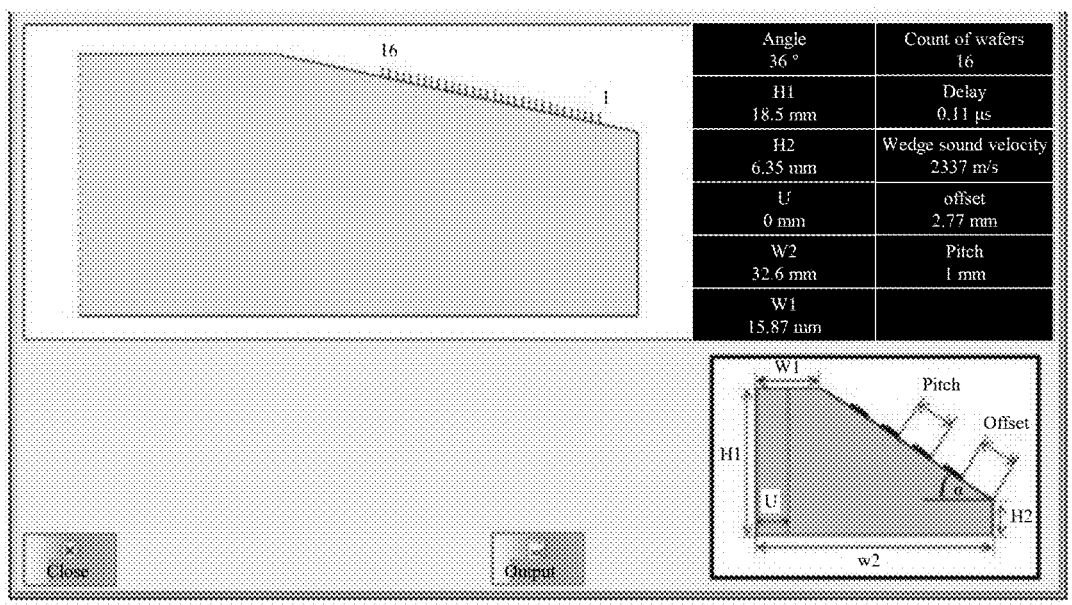
FIG. 5 is a schematic diagram illustrating a geometric parameter of a shear wave probe wedge according to Embodiment 1 of the present disclosure.

(2) Parameters of a phased array shear wave probe: a one-dimensional 16-wafer linear phased array probe is used, e=0.9 mm, g=0.1, p=1 mm, W=10 mm, the count of the activation wafers is 16, the frequency is f=2 MHZ, an angle of a shear wave wedge is 36°, and its geometrical parameters are shown in FIG. 5.

2. A weak magnetic detection device is a WMP-I model device having 16 channels. The probe uses a conventional sensor with a resolution of 50 nT and a range of ±200000 nT.

Step 3, the T-shaped fillet weld is subjected to zone discrimination.

1. Detection is performed from a web plate side of the B-side by dividing the T-shaped fillet weld into two zones, where equal zone discrimination or unequal zone discrimination may be adopted. The present embodiment adopts equal zone discrimination. That is, a first zone is from the surface to the position of ½ thickness, i.e., 0-20 mm, and a second zone is from 20 mm to 40 mm of the thickness. During the scanning, the coverage of ultrasonic beams in these two zones should be overlapped. The coverage in one zone may be larger in width while the coverage in another may be smaller in width, but the sector scanning beams shall overlap each other.
2. Detection is performed from a flange plate side of the C-side only using secondary shear waves, and only one zone (i.e., 0-30 mm) is obtained by zone discrimination according to the wave order. This side cannot be detected using longitudinal waves.

Step 4, target zone and mission of the PAUT and the weak magnetic detection are determined.

Figure 6:
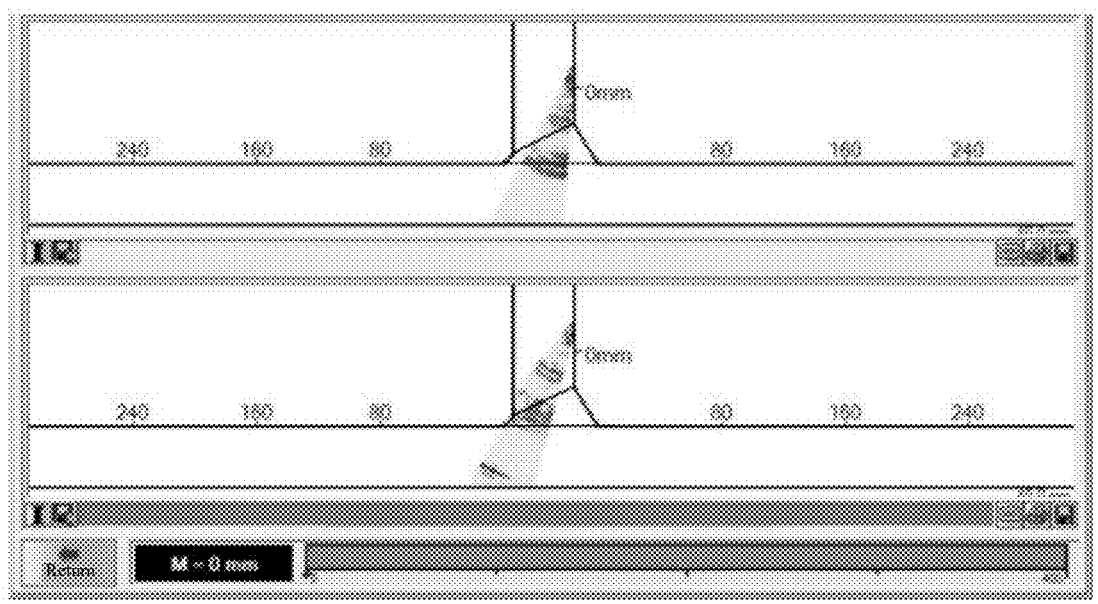
FIG. 6 is a diagram illustrating sector scanning beam coverage of PAUT longitudinal wave scanning on a web plate side according to Embodiment 1 of the present disclosure.
Figure 7:
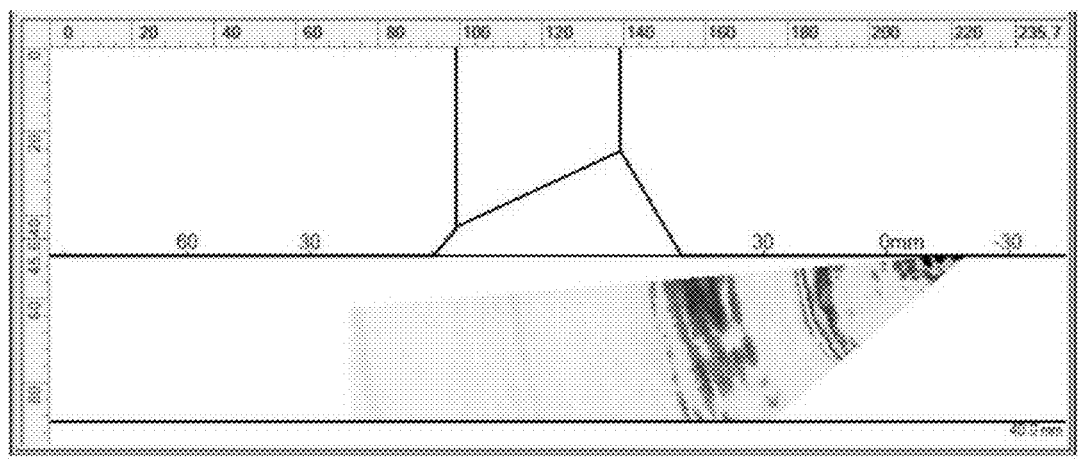
FIG. 7 is a diagram illustrating sector scanning beam coverage of PAUT longitudinal wave scanning on a flange plate side according to Embodiment 1 of the present disclosure.
Figure 8:
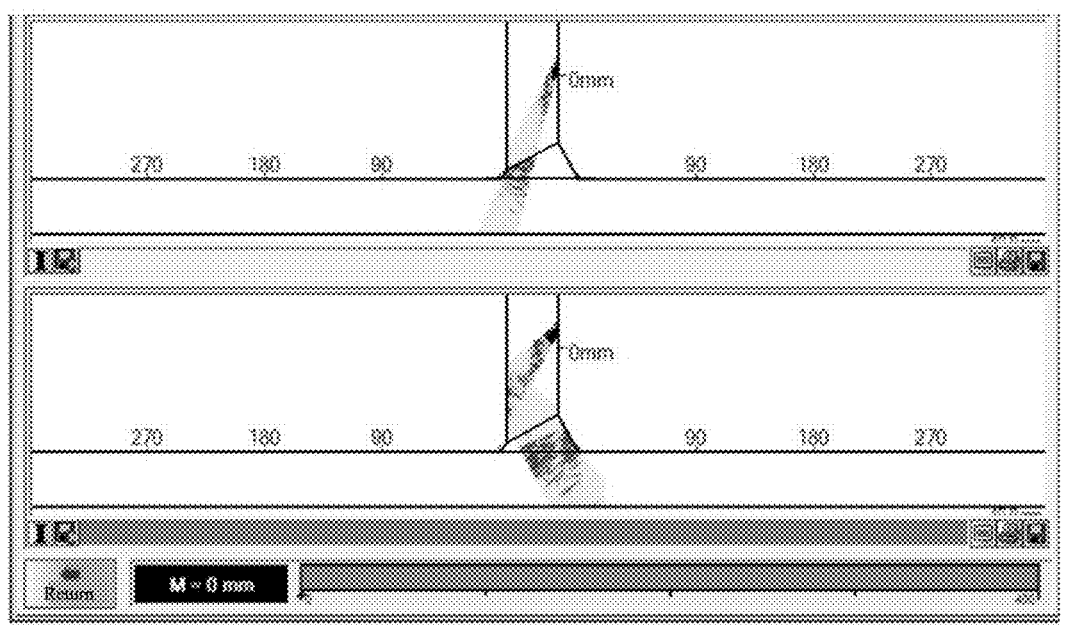
FIG. 8 is a diagram illustrating sector scanning beam coverage of PAUT shear wave scanning on a web plate side according to Embodiment 1 of the present disclosure.
Figure 9:
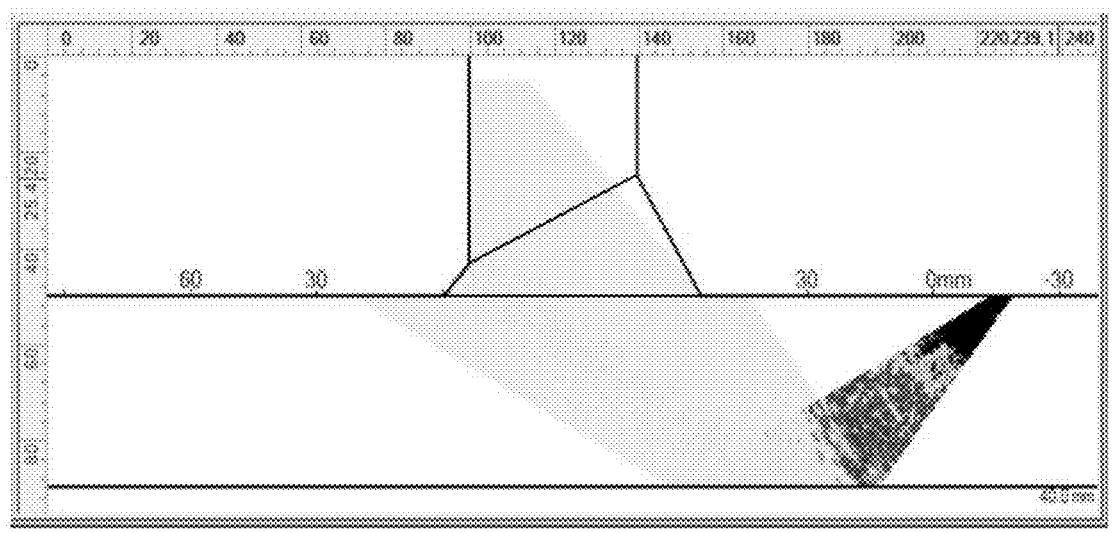
FIG. 9 is a diagram illustrating sector scanning beam coverage of secondary wave detection using PAUT shear waves on a web plate side according to Embodiment 1 of the present disclosure.

1. The target zone and mission of the PAUT.
   (1) The target zone and mission of the longitudinal wave scanning of the PAUT.
   Detection from the B-side (i.e., the web plate side):
   For the first zone (0-20 mm), the count of excited wafers of the phased array probe are 32, the sector scanning angle is in a range of 63°-85°, and only primary longitudinal wave can be used for sector scanning detection.
   A distance from the front end of the probe to the edge of the weld is 25 mm, the weld width is 25 mm (as shown in FIG. 2), and the front distance of 85° beams of phased array longitudinal waves is approximately 15.21 mm. A non-detectable zone is theoretically calculated to be approximately 6 mm, i.e., the thickness of 6 mm below the surface of the B-side of the workpiece is the non-detectable zone (i.e., 0-6 mm).
   According to practical experience, the non-detectable zone should be greater than the theoretical value (a size of the non-detectable zone depends on the parameters of the phased array probe used and the count of the excited wafers). The non-detectable zone of this workpiece is approximately ⅓ of the thickness of the workpiece, i.e., approximately 14 mm, plus a fillet weld reinforcement thickness 15 mm (as shown in FIG. 2). The actual non-detectable zone of the longitudinal wave scanning is 14 mm below the surface of the workpiece plus the fillet weld reinforcement thickness.
   For the second zone (i.e., 20 mm-40 mm), the count of the excited wafers of the phased array probe are 32, the sector scanning angle is in a range of 50°-75°, and primary longitudinal wave sector scanning is adopted for detection. The distance from the front end of the probe to the edge of the weld is 25 mm, and the width of the weld is 25 mm (as shown in FIG. 2), no non-detectable zone is existing and the whole second zone is completely covered.
   FIG. 6 is a diagram illustrating sector scanning beam coverage of PAUT longitudinal wave scanning on a T-shaped fillet weld on a web plate side of a B-side. It shows that the coverage zones of two sets of primary wave sector scanning make the two zones overlapping with each other.
   Detection is performed from a C-side (i.e., a flange plate side).
   Since only primary longitudinal wave sector scanning can be used for detection, which is incapable of detecting an internal defect in the T-shaped fillet weld, therefore the longitudinal wave sector scanning cannot be used for detection on the C-side.
   FIG. 7 is a diagram illustrating sector scanning beam coverage of PAUT longitudinal wave scanning on a T-shaped fillet weld on a flange plate side of a C-side. Beams of primary wave sector scanning do not cover a weld detection zone.
   (2) The target zone and mission of the shear wave scanning of the PAUT.
   Detection is performed from the B-side (i.e., the web plate side).
   For the first zone (i.e., 0-20 mm), the count of the excited wafers of the phased array probe are 16, the sector scanning angle is in a range of 38°-61°, and the first zone is detected by secondary shear wave sector scanning. The distance from the front end of the probe to the edge of the weld is 50 mm. In fact, the coverage of the sector scanning angle 38°-61° already exceeds the height of the first zone, i.e. the coverage depth is in a range of 0-29 mm.
   For the second zone (i.e., 20 mm-40 mm), the count of the excited wafers of the phased array probe are 16, the sector scanning angle is in a range of 58°-75°, and the second zone is detected by primary wave sector scanning. The distance from the front end of the probe to the edge of the weld is 50 mm. The actual coverage depth of the primary wave sector scanning in this zone is in a range of 22 mm-40 mm. Meanwhile, this zone is also covered by secondary wave sector scanning. The ranges of the primary wave sector scanning and the secondary wave sector scanning overlap each other, so as to achieve the complete coverage of the entire weld.
   FIG. 8 is a diagram illustrating sector scanning beam coverage of PAUT shear wave scanning on a T-shaped fillet weld on a web plate side of a B-side, i.e., a coverage zone of primary wave sector scanning and a coverage zone of secondary wave sector scanning. It shows that the ultrasonic beams of the two coverage zones overlap with each other.
   Detection is performed from the C-side (i.e., the flange plate side).
   Since only secondary shear wave sector scanning can be used for detection, a defect on a fusion surface can be detected, but the probability of detection (PoD) of a defect inside the weld is low, as shown in FIG. 9.
   (3) Evaluation criteria based on results of the longitudinal wave scanning and the shear wave scanning of the PAUT.
   For the evaluation of a defect inside the weld (within a weld deposit), the longitudinal wave scanning data shall prevail.
   For the evaluation of a defect near a fusion line, the shear wave scanning result shall prevail.
   A defect detected by both the longitudinal wave scanning and the shear wave scanning is evaluated comprehensively.
2. The target zone and mission of the weak magnetic detection.
   The weak magnetic detection is performed on a D-side (i.e., the weld reinforcement), and the scanning of the complete weld volume is implemented by making the probe close to, but not contacting on the surface of the weld by moving manually or mechanically parallel to the direction of the weld. The data of the weak magnetic detection is analyzed and evaluated in accordance with the following criteria.
   (1) If the defect identified by the weak magnetic scanning is the same as that of the defect identified by both longitudinal wave and shear wave scanning, or by any single scanning of the PAUT, the PAUT scanning data shall prevail.
   (2) For the non-detectable zone, the difficult-to-detect defect, and the acoustic transparency defect during the longitudinal wave scanning and the shear wave scanning of the PAUT, the weak magnetic detection data shall prevail.

Step 5, five simulated defects in the test piece 1 are detected, and the results are analyzed and evaluated.
1. The detection result of the defect 1 #root incomplete penetration.
   (1) The design of the defect 1 #root incomplete penetration is shown in FIG. 10.
   (2) The detection result of the defect 1 #root incomplete penetration.
   1) The result of the longitudinal wave scanning of the PAUT.
   The result data of the defect 1 #by longitudinal wave scanning of the PAUT shows: the length is 13.8 mm, the depth is 38.1 mm, and the self-height is 3.5 mm. 2) The result of the shear wave scanning of the PAUT.
   The result data of the defect 1 #by shear wave scanning of the PAUT shows: the length is 11.6 mm, the depth is 39.5 mm, and the self-height is 3.1 mm.
   (3) The result of the weak magnetic detection.
   The defect 1 #root incomplete penetration is also identified by the weak magnetic detection at this position, and the length of the defect is approximately 20 mm.
   4) Comprehensive evaluation.
   According to the comprehensive evaluation criteria, if the same defect is identified by both the PAUT and the weak magnetic detection, the detection result of the PAUT shall prevail. The result of the PAUT is evaluated comprehensively. Therefore, the final detection result of the defect 1 #root incomplete penetration shows: the length is 13.8 mm, the depth is 38.1 mm, and the self-height is 3.1 mm.

2. The detection result of the defect 2 #slag inclusion.
   (1) The design of the defect 2 #slag inclusion is shown in FIG. 11.
   (2) The detection result of the defect 2 #slag inclusion.
   1) The result of the longitudinal wave scanning of the PAUT.
   The result of the longitudinal wave scanning of the PAUT is: not detected. Since the defect 2 #slag inclusion is close to the edge of the non-detectable zone of the longitudinal wave scanning, the defect 2 #slag inclusion is not detected.
   2) The result of the shear wave scanning of the PAUT.
   The result data of the shear wave scanning of the PAUT shows: the length is 18.9 mm, the depth is 13.7 mm, and the self-height is 4.8 mm.
   (3) The result of the weak magnetic detection.
   The defect 2 #slag inclusion is detected by the weak magnetic detection, and the length is approximately 25 mm.
   4) Comprehensive evaluation.
   According to the comprehensive evaluation criteria, the defect 2 #slag inclusion is not detected by the longitudinal wave scanning but detected by the shear wave scanning of the PAUT, and it also be detected by the weak magnetic detection, therefore the shear wave scanning result of the PAUT shall prevail.

3. The detection result of the defect 3 #crack.
   (1) The design of the defect 3 #crack is shown in FIG. 12.
   (2) The detection result of the defect 3 #crack.
   1) The result of the longitudinal wave scanning of the PAUT.
   The result data of the longitudinal wave scanning of the PAUT shows: the defect 3 #crack not detected. Since the defect 3 #crack is in the non-detectable zone of the longitudinal wave scanning, the defect 3 #crack is not detected.
   2) The result of the shear wave scanning of the PAUT.
   The result data of the shear wave scanning of the PAUT shows: the defect 3 #crack not detected. Since the defect 3 #crack is located inside the weld and close to the surface of the weld, the wave path is so long that the sound wave is severely affected by the coarse grains, the attenuation is also large, and thus the shear wave beams are not easy to penetrate through the weld.
   (3) The result of the weak magnetic detection.
   The defect 3 #crack is detected by the weak magnetic detection, and the length is approximately 22 mm.
   4) Comprehensive evaluation.
   According to the evaluation criteria, the defect 3 #crack is not defected by the PAUT technique but detected by the weak magnetic detection, therefore the weak magnetic detection result shall prevail.

4. The detection result of the defect 4 #porosity.
   (1) The design of the defect 4 #porosity is shown in FIG. 13.
   (2) The detection result of the defect 4 #porosity.
   1) The result of the longitudinal wave scanning of the PAUT.
   The result of the longitudinal wave scanning of the phase array ultrasonic testing shows: the defect 4 #porosity not detected. Since the defect 4 #porosity is located in the non-detectable zone of the longitudinal wave scanning, the defect 4 #porosity is not detected.
   2) The result of the shear wave scanning of the PAUT.
   The result of the shear wave scanning of the PAUT shows: the defect 4 #porosity not detected. Since the defect 4 #porosity is located inside the weld and affected by the coarse grains, the shear wave beams are not easy to penetrate through the weld.
   3) The result of the weak magnetic detection.
   The defect 4 #porosity is detected by the weak magnetic detection, and the length is approximately 8 mm.
   4) Comprehensive evaluation.
   According to the evaluation criteria, the defect 4 #porosity is not detected by the PAUT technique but detected by the weak magnetic detection, therefore the weak magnetic detection result shall prevail.

5. The detection result of the defect 5 #lack of side fusion.
   (1) The design of the defect 5 #lack of side fusion is shown in FIG. 14.
   (2) The detection result of the defect 5 #lack of side fusion.
   1) The result of the longitudinal wave scanning of the PAUT.
   The result of the longitudinal wave scanning of the PAUT shows: the length is 9.5 mm, the depth is 23 mm, and the self-height is 4.4 mm.
   2) The result of the shear wave scanning of the PAUT.
   The result of the shear wave scanning of the PAUT shows: the length is 15.3 mm, the depth is 21 mm, and the self-height is 4.0 mm.
   (3) The result of the weak magnetic detection.
   The defect 5 #lack of side fusion is detected by the weak magnetic detection, and the length is approximately 10 mm.

4) Comprehensive evaluation.

According to the evaluation criteria, the defect 5 #lack of side fusion is identified by both the PAUT and the weak magnetic detection, therefore the result of the PAUT shall prevail. Since the defect 5 #lack of side fusion is identified by both the longitudinal wave scanning and the shear wave scanning, the comprehensive evaluation is required and finally the shear wave scanning result shall prevail, i.e., the length is 15.3 mm, the depth is 21 mm, and the self-height is 4.0 mm.

Embodiment 2

Figure 15:
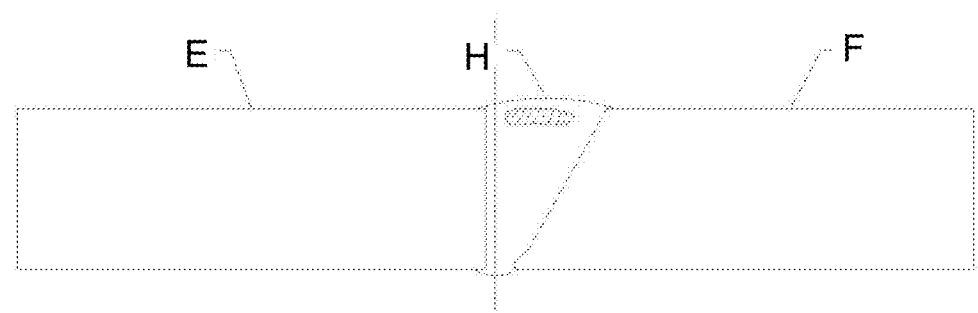
FIG. 15 is a schematic diagram illustrating a design of defect 3 #transverse crack in Embodiment 2.

A butt weld simulated defect test piece 2 is detected in Embodiment 2. A butt weld is formed by the austenite material 316L with two members specifications of 400 mm×200 mm×40 mm and 400 mm×200 mm×40 mm with a modified single bevel preparation. As shown in FIG. 15, the weld preparation parameters are as follows: the bevel angle in the filling & cap passes is 25°, the bevel angle in the hot pass is 45°, the height of the filling zone is 35 mm, the height of the root face is 2 mm, the cap reinforcement width is 28 mm, the root reinforcement width is 8 mm, and the thickness of the workpiece is 40 mm. Six simulated defects are fabricated in the butt weld, i.e., defect 1 #root incomplete penetration, defect 2 #porosity, defect 3 #transverse crack, defect 4 #slag inclusion, defect 5 #lack of side fusion, and defect 6 #external toe crack. Take the defect 3 #transverse crack detection as an example for analysis. (design parameters of defect 3 #transverse crack are: length 10 mm+5 mm, depth 1±1 mm, and self-height 4±1 mm). For the other defects analysis except 3 #, pls refer to that of Embodiment 1. The simulated defect test piece uses a welding process of one-side welding with back formation. The scanning surface is E-side, F-side, and H-side, other surfaces are not be scanned, as shown in FIG. 15. That is, the detection can only be performed on one surface and two sides.

Step 1, an inspection approach for a butt weld simulated defect test piece 2 is determined.

The inspection approach for the butt weld simulated defect test piece 2 uses the PAUT and the weak magnetic detection.

Step 2, Detection devices and probes selection
1. The PAUT device and the PAUT probe are selected as the same with that in Embodiment 1.
2. The weak magnetic detection device and the probe are selected as the same with that in Embodiment 1.

Step 3, the butt weld is subjected to zone discrimination.

The butt weld is divided into two zones from scanning surface of E-side and F-side, where equal zone discrimination or unequal zone discrimination may be adopted.

Here adopts equal zone discrimination for embodiment 2. That is, the first zone is from the surface to the position of ½ thickness, i.e., 0-20 mm, and the second zone is from 20 mm to 40 mm of the thickness. During the scanning, the coverage of ultrasonic beams in these two zones should be overlapped. The coverage in one zone may be larger while the coverage in another may be smaller, but the sector scanning beams shall overlap each other.

Step 4, target zones and mission of the PAUT and the weak magnetic detection are determined.
1. The target zone and mission of the PAUT.
(1) The target zone and mission of the longitudinal wave scanning of the PAUT.

Detection is performed from the E-side and the F-side.

For the first zone (0-20 mm), the count of the excited wafers of the phased array probe are 32, and primary longitudinal wave sector scanning is adopted for detection. Since the bevel forms are different from E-side scanning and F-side scanning, the sector scanning angles for the E-side and the F-side may be different. The sector scanning angle of the E-side is in a range of 65°-85°, and the sector scanning angle of the F-side is in a range of 65°-85°.

The distance from the front end of the probe to the edge of the weld is 20 mm, the width of the weld is 28 mm (as shown in FIG. 15), and the front distance of the 85° beams of the phased array longitudinal waves is approximately 15.21 mm. The size of non-detectable zone is theoretically calculated to be approximately 6 mm, i.e., the thickness of 6 mm below the surface of the workpiece (i.e., 0-6 mm). According to the practical experience, the size of non-detectable zone should be greater than the theoretical value, which is approximately ⅓ of the thickness of the workpiece, i.e., approximately 14 mm. Considering plus the weld reinforcement approximately 2 mm (as shown in FIG. 2), the actual non-detectable zone of the longitudinal wave scanning is 16 mm in thickness below the surface of the weld reinforcement of the workpiece.

For the second zone (i.e., 20 mm-40 mm), the count of the excited wafers of the phased array probe are 32, and primary longitudinal wave sector scanning is adopted for detection.

Figure 16:
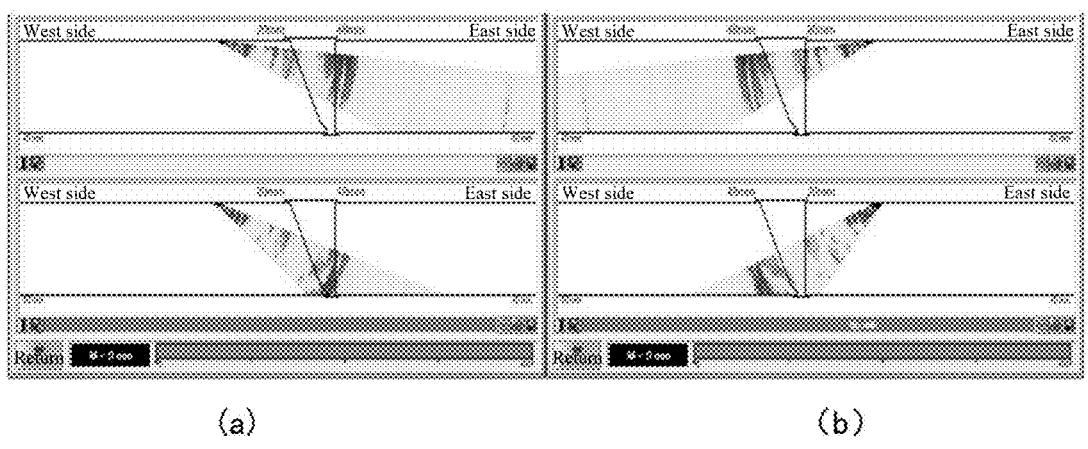
FIG. 16 is a diagram illustrating sector scanning beam coverage of PAUT longitudinal waves in Embodiment 2, where (a) is a diagram illustrating F-plane sector scanning beam coverage, and (b) is a diagram illustrating E-plane sector scanning beam coverage.

The E-side sector scanning angle is in a range of 40°-68°, and the F-side sector scanning angle is in a range of 52°-72°. The distance from the front end of the probe to the edge of the weld is 20 mm, and the width of the weld is 28 mm (as shown in FIG. 16), which has no non-detectable zone and it can be completely covered.

(2) The target zone and mission of the shear wave scanning of the PAUT.

Detection is performed from the E-side.

The distance from the front end of the probe to the edge of the weld while scanning the first zone and the second zone is 50 mm, respectively.

For the first zone (i.e., 0-20 mm), the count of the excited wafers of the phased array probe are 32, and the first zone is detected by using the secondary shear wave sector scanning. Two sets of sector scanning are adopted in the first zone scanning with the angle in a range of 38°-52° and 45°-56°, respectively.

For the second zone (i.e., 20 mm-40 mm), the count of the excited wafers of the phased array probe are 32, and the second zone is detected by using the primary shear wave sector scanning. One set of sector scanning for detection is adopted in the second zone, i.e., the sector scanning angle is in a range of 55°-75°.

Detection is performed from the F-side.

The distance from the front end of the probe to the edge of the weld while scanning the first zone and the second zone is 50 mm, respectively.

For the first zone (i.e., 0-20 mm), the count of the excited wafers of the phased array probe are 32, and the first zone is detected by using the secondary shear wave sector scanning. Two sets of sector scanning are adopted for the first zone scanning with the angle in a range of 38°-55° and 50°-62°, respectively.

Figure 17:
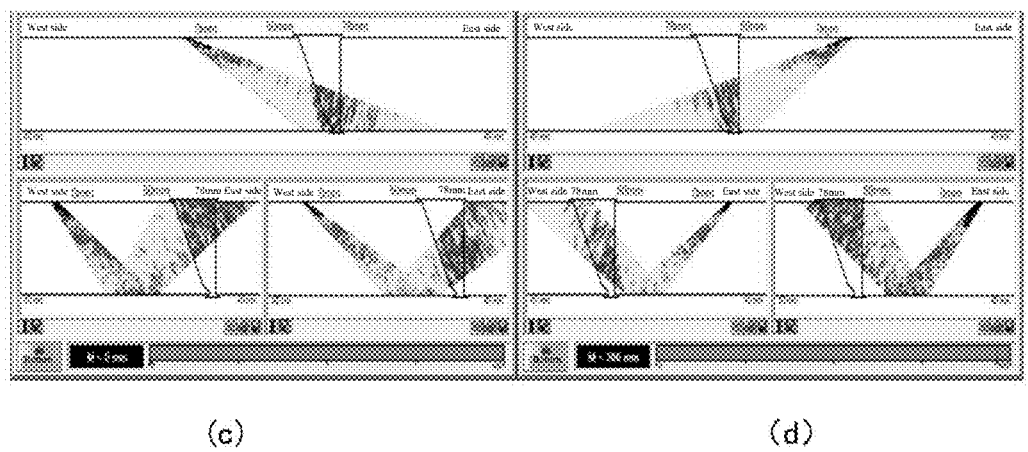
FIG. 17 is a diagram illustrating sector scanning beam coverage of PAUT shear waves in Embodiment 2, where (c) is a diagram illustrating F-plane sector scanning beam coverage, and (d) is a diagram illustrating E-plane sector scanning beam coverage.

For the second zone (i.e., 20 mm-40 mm), the count of the excited wafers of the phased array probe are 32, and the second zone is detected by using the primary shear wave sector scanning. One set of sector scanning for detection is adopted in the second zone scanning with the angle in a range of 60°-75°, as shown in FIG. 17.

(3) Evaluation criteria based on results of the longitudinal wave scanning and the shear wave scanning of the PAUT.

For the evaluation of a defect inside the weld (within a weld deposit), the longitudinal wave scanning data shall prevail.

For the evaluation of a defect near the fusion line, the shear wave scanning result shall prevail.

The defect detected by both the longitudinal wave scanning and the shear wave scanning is evaluated comprehensively.

2. The target zone and mission of the weak magnetic detection.

The weak magnetic detection is performed on the H-side (i.e., the weld reinforcement), and the scanning of the complete weld volume is implemented by making the probe close to, but not contacting on the surface of the weld by moving manually or mechanically parallel to the direction of the weld. The scanning data of the weak magnetic detection is analyzed and evaluated in accordance with the following criteria.

(1) If the defect identified by the weak magnetic scanning is the same as that of the defect identified by both longitudinal wave and shear wave scanning, or by any single scanning of the PAUT, the PAUT scanning data shall prevail.

(2) For the non-detectable zone, the difficult-to-detect defect, and the acoustic transparency defect during the longitudinal wave scanning and the shear wave scanning of the PAUT, the weak magnetic detection data shall prevail.

Step 5, the simulated defect 3 #transverse crack in the test piece 2 is detected, and results are analyzed and evaluated.

1. The detection result of the defect 3 #transverse crack.
(1) The design of the simulated defect 3 #transverse crack is shown in FIG. 15.
(2) The detection result of the defect 3 #transverse crack.
1) The result of the longitudinal wave scanning of the PAUT.

The defect 3 #transverse crack cannot be identified by the longitudinal wave scanning of the PAUT because it is located in the non-detectable zone.

2) The result of the shear wave scanning of the PAUT.

The defect 3 #transverse crack cannot be identified by the shear wave scanning of the PAUT because the defect is located on the upper surface of the weld. The secondary shear waves adopted for scanning has a long wave path, which is affected by the coarse grains of the austenitic weld, therefore the capacity of the shear waves penetration is reduced due to the severe attenuation. Additionally, the direction of the transverse crack is approximately parallel to the direction of the shear wave beams, which makes it difficult to detect the defect 3 #transverse crack.

(3) The result of the weak magnetic detection.

The defect 3 #transverse crack is identified by the weak magnetic detection, and the length is approximately 10 mm.

4) Comprehensive evaluation.

According to the evaluation criteria, if the defect failed to be identified by the PAUT scanning but successfully be identified by the weak magnetic detection at the same position, it can be determined that the defect is located in the non-detectable zone or it is a difficult-to-detect defect or an acoustic transparency defect. Since both longitudinal wave scanning and shear wave scanning of PAUT has been applied, which can determine the defect is not the acoustic transparency defect, and it is located in the non-detectable zone, and then it can be determined a transverse crack by the analysis based on the weak magnetic detection.

Embodiment 3

Figure 18:
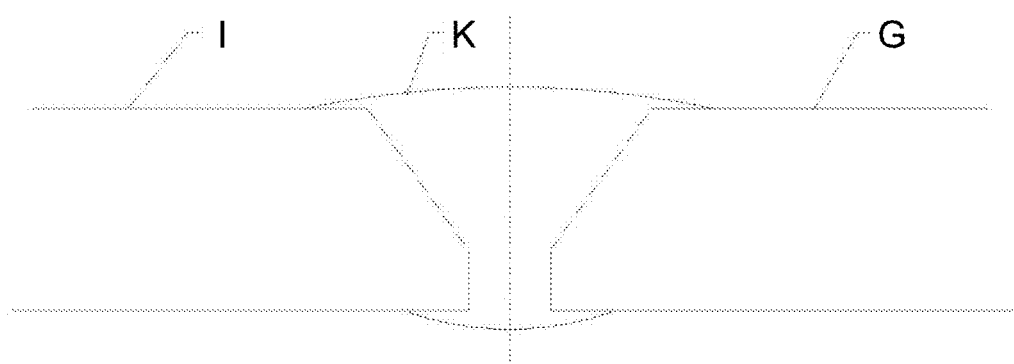
FIG. 18 is a schematic diagram illustrating a single V groove butt weld in Embodiment 3.

A pipe butt girth weld simulated defect test piece 3 is detected in Embodiment 3. The butt girth weld is formed by the austenite material 316L with specifications of ¢ 159 mm×16 mm×500 mm (length) and single V groove. As shown in FIG. 18, the groove parameters are as shows: the bevel angle is 30°, the height of the filling zone is 14 mm, the cap reinforcement width is 20 mm, the root reinforcement width is 7 mm, and the thickness of the workpiece is 16 mm. Five defects had been fabricated in the butt girth weld, i.e., defect 1 #root incomplete penetration, defect 2 #slag inclusion, defect 3 #crack, defect 4 #porosity, and defect 5 #lack of side fusion. All the parameters for the simulated defects are shown in Table 2. The test piece uses the welding technique of one-side welding with back formation. The scanning surface is I-side, G-side, and K-side, other surfaces cannot be scanned, as shown in FIG. 18. That is, the detection scanning can only be performed on one surface and two sides. The detection is performed using the innovative ultrasonic-magnetic combination technique, namely PAUT sector scanning detection and weak magnetic detection:

Step 1, an inspection approach for the simulated defect of a pipe butt girth weld test piece 3 is determined.

The combination of PAUT and weak magnetic detection are applied for the test piece 3 detection. The PAUT adopts the longitudinal wave scanning and the shear wave scanning.

Design parameters of the simulated defect test piece 3

TABLE 2

Design parameters of pipe butt girth weld simulated defect test piece 3

Figure 22:
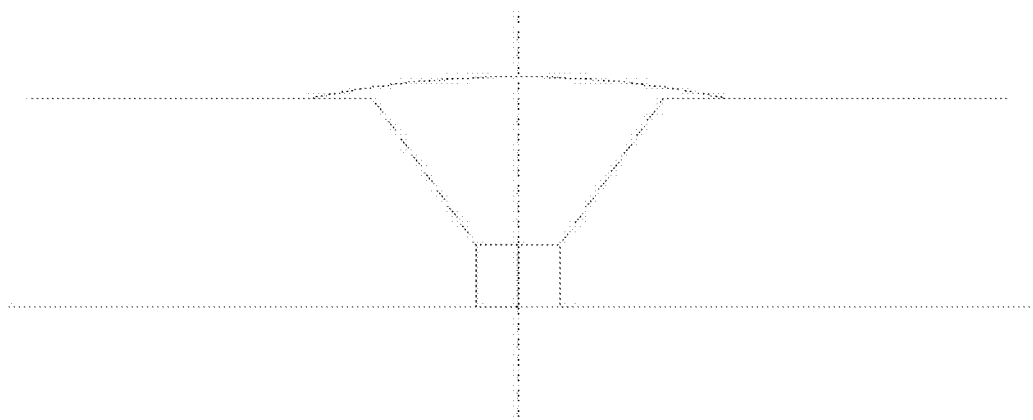
FIG. 22 is a schematic diagram illustrating a design of defect 1 #root incomplete penetration in Embodiment 3.
Figure 23:
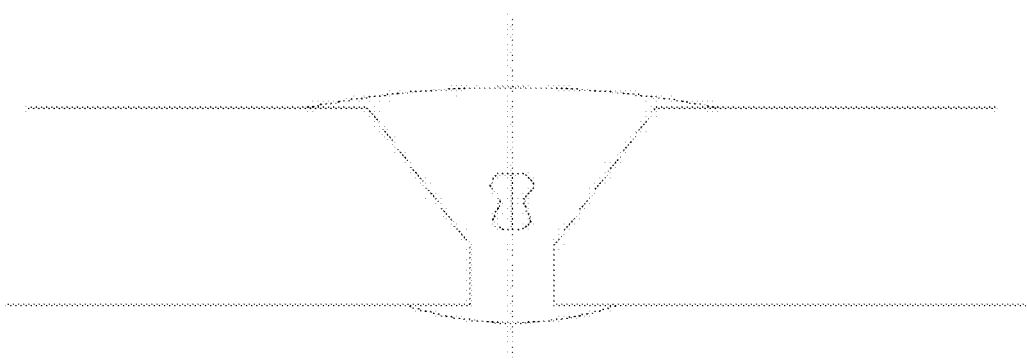
FIG. 23 is a schematic diagram illustrating a design of defect 2 #slag inclusion in Embodiment 3.
Figure 24:
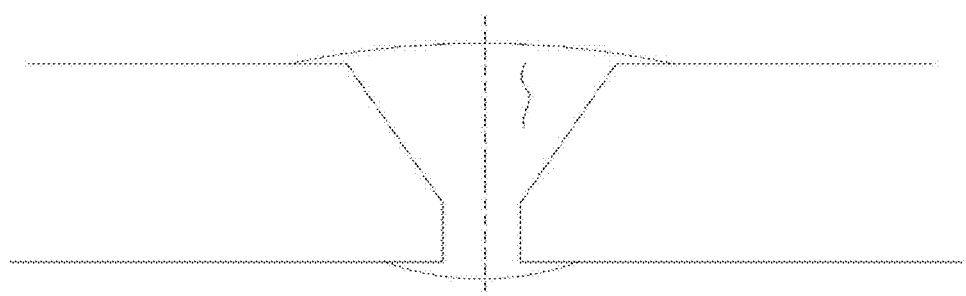
FIG. 24 is a schematic diagram illustrating a design of defect 3 #surface non-opening crack in Embodiment 3.

| Specifications of test piece mm | Defect Code | Nature of defect | Circumferential position mm | Defect size mm | | | Note |
| --- | --- | --- | --- | --- | --- | --- | --- |
| | | | | Length (error ± 5) | Depth (error ± 1) | Self-height (error ± 1) | |
| Φ159 × 16 × 500 (length) | 1# | Root incomplete penetration | 65-87 | 16 (converted to 19.4) | 14 | 2 | See FIG. 22 |
| | 2# | Slag inclusion | 237-260 | 20 (converted to 21.9) | 7 | 3 | See FIG. 23 |
| | 3# | Surface non-opening crack | 321-341 | 20 | 0 | 4 | See FIG. 24 |

TABLE 2-continued

Design parameters of pipe butt girth weld simulated defect test piece 3

Figure 25:
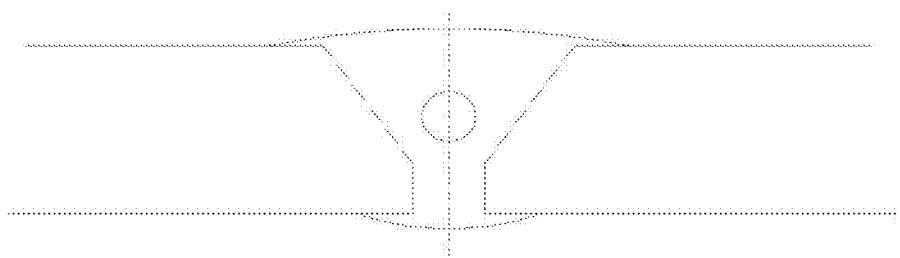
FIG. 25 is a schematic diagram illustrating a design of defect 4 #porosity in Embodiment 3.
Figure 26:
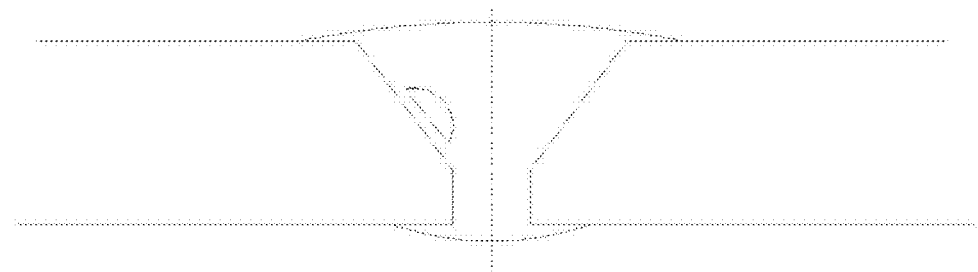
FIG. 26 is a schematic diagram illustrating a design of defect 5 #lack of side fusion in Embodiment 3.

| Specifications of test piece mm | Defect Code | Nature of defect | Circumferential position mm | Defect size mm | | | Note |
|---|---|---|---|---|---|---|---|
| | | | | Length (error ± 5) | Depth (error ± 1) | Self-height (error ± 1) | |
| | 4# | Porosity | 412 | Φ3(converted to 3.2) ± 1 (0.5-1) | 4.5 | / | See FIG. 25 |
| | 5# | Lack of side fusion | 480-500 | 16 (converted to 16.4) | 2 | 3 | See FIG. 26 |

Figure 19:
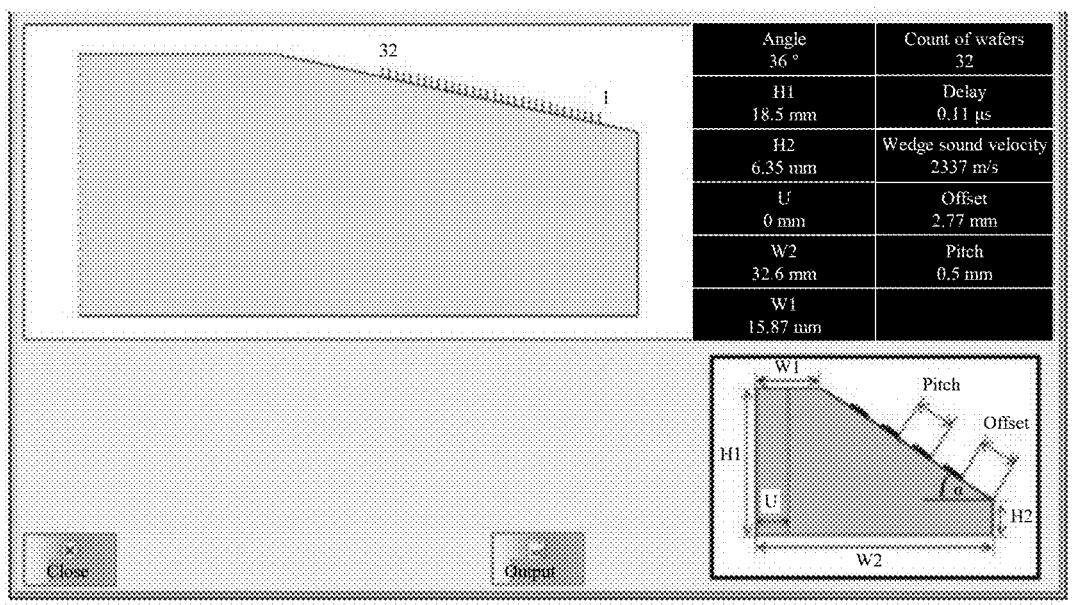
FIG. 19 is a schematic diagram illustrating a geometric parameter of a shear wave probe wedge in Embodiment 3.

Step 2, Detection devices and probes selection.
1. The PAUT device and the phased array longitudinal wave probe is the same as that in Embodiment 1. The parameters of the phased array shear wave probe are as follows: a one-dimensional 32-wafer linear phased array probe is selected, where e=0.4 mm, g=0.1 mm, p=0.5 mm, W=10 mm, the count of the activated wafers are 32, the frequency f=5 MHZ, and the angle of the shear wave wedge is 36°, as shown in FIG. 19.
2. The weak magnetic detection device and the probe are the same as that in Embodiment 1.

Step 3, The butt weld is subjected to zone discrimination.

Detection is performed from the I-side and the G-side by dividing the butt weld into two zones, where equal zone discrimination or unequal zone discrimination may be adopted. The equal zone discrimination is applied to the Embodiment 3. The first zone is from the surface to the location of ½ thickness, i.e., 0-8 mm, and the second zone is from 8 mm to 16 mm of the thickness. During the scanning, the coverage of ultrasonic beams in these two zones should be overlapped. The coverage in one zone may be larger in width while the coverage in another may be smaller in width, but the sector scanning beams shall overlap each other.

Step 4, The target zone and mission of the PAUT and the weak magnetic detection are determined.
1. The target zone and mission of the PAUT.
   (1) The target zone and mission of the longitudinal wave scanning of the PAUT.

Figure 20:
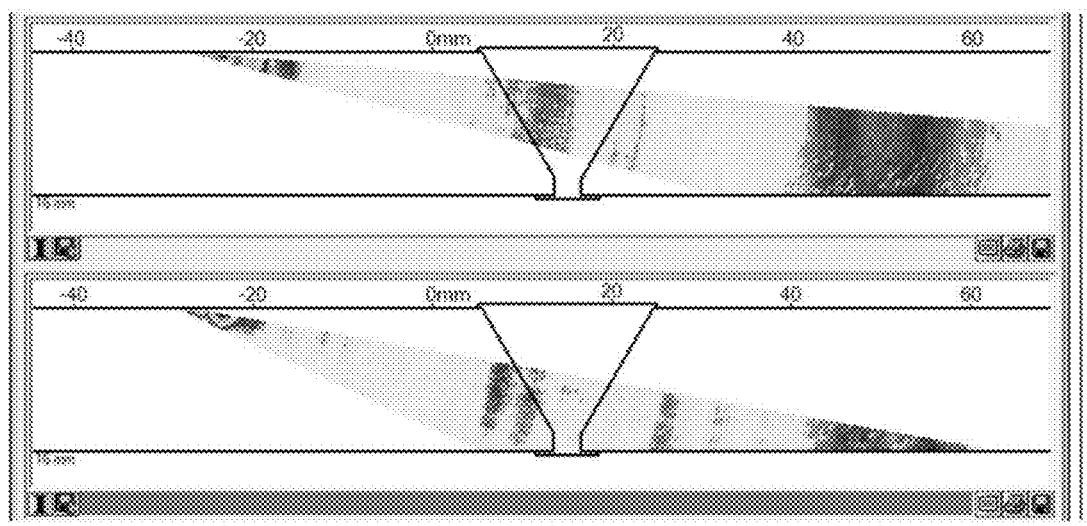
FIG. 20 is a diagram illustrating sector scanning beam coverage of PAUT longitudinal waves in Embodiment 3.

Scanning is performed from the I-side and the G-side:

Since the specifications of the workpiece is @ 159 mm×16 mm with single V groove and it is symmetric, the scanning setups for I-side and G-side are the same. The primary longitudinal wave sector scanning is adopted for detection. The distance from the front end of the probe to the edge of the weld is 5 mm, as shown in FIG. 20.

The width of the weld is 25 mm (as shown in FIG. 18), and the front distance of 85° beams of phased array longitudinal waves is approximately 26.3 mm. The size of non-detectable zone is theoretically calculated to be approximately 3.6 mm≈4 mm, i.e., the thickness of 4 mm below the surface of the workpiece (i.e., 0-4 mm). According to the practical experience, the size of non-detectable zone should be greater than the theoretical value, which is approximately ⅓ of the thickness of the workpiece and is approximately 5.3 mm. Considering to plus the weld reinforcement 0.5 mm, the actual non-detectable zone of the longitudinal wave scanning is 6 mm in thickness below the surface of the reinforcement of the workpiece.

For the first zone (i.e., 0-8 mm), the count of the excited wafers of the phased array probe are 32, the primary longitudinal wave sector scanning is adopted for detection, and the sector scanning angle adopted in the first zone is in a range of 75°-85°.

For the second zone (i.e., 8 mm-16 mm), the count of the excited wafers of the phased array probe are 24, the primary longitudinal wave sector scanning is adopted for detection, and the sector scanning angle adopted in the second zone is in a range of 65°-80°.

(2) The target zone and mission of the shear wave scanning of the PAUT.

Scanning is performed from the I-side and the G-side.

Figure 21:
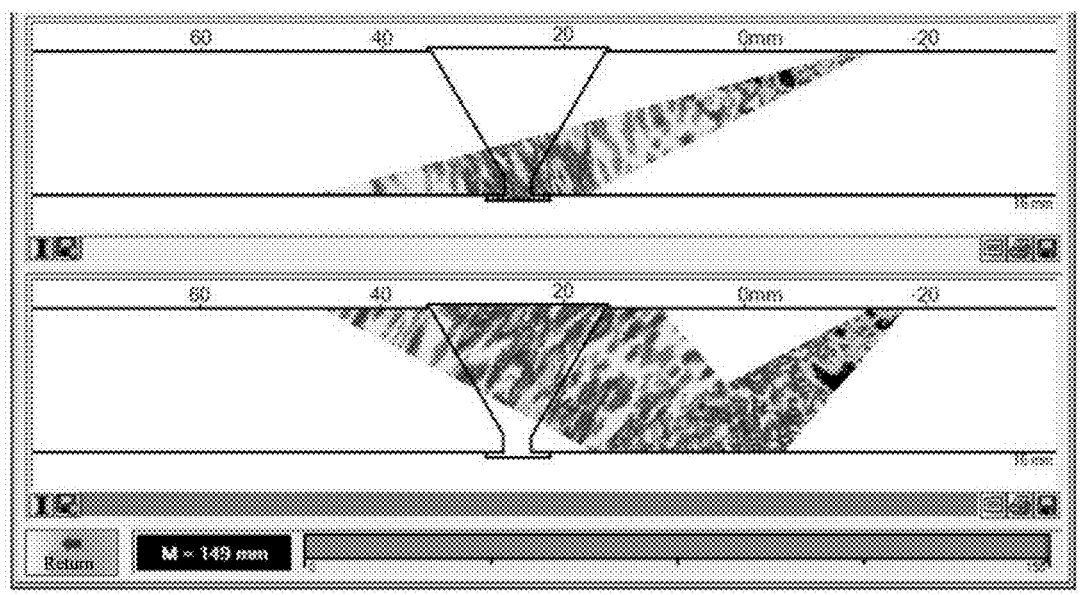
FIG. 21 is a diagram illustrating sector scanning beam coverage of PAUT shear waves in Embodiment 3.

The distance from the front end of the probe to the edge of the weld for scanning of the first zone and the second zone are both 15 mm, as shown in FIG. 21.

For the first zone (i.e., 0-8 mm), the count of the excited wafers of the phased array probe are 32, the secondary shear wave sector scanning is adopted for scanning of the first zone, and the sector scanning angle adopted in the first zone is in a range of 40°-62°.

For the second zone (i.e., 8 mm-16 mm), the count of the excited wafers of the phased array probe are 32, the primary shear wave sector scanning is adopted for scanning of the second zone, and the sector scanning angle adopted in the second zone is in a range of 63°-75°.

It should be noted that no undetectable zone in this workpiece due to its light wall thickness and two sides scanning on the weld.

(3) Evaluation criteria based on results of the longitudinal wave scanning and the shear wave scanning of the PAUT.

For the evaluation of a defect inside the weld (within a weld deposit), the longitudinal wave detecting data shall prevail. For the thin wall workpiece, the defect within the weld deposit can also be detected by the shear wave scanning, so the scanning data of both longitudinal wave scanning and shear wave scanning is considered also.

For the evaluation of a defect near the fusion line, the shear wave detecting result shall prevail.

The defect identified by both longitudinal wave scanning and shear wave scanning is evaluated comprehensively.

2. The target zone and mission of the weak magnetic detection.

The weak magnetic detection is performed on the K-side (i.e., the weld reinforcement), and the scanning of the complete weld volume is implemented by making the probe close to, but not contacting on the surface of the weld by moving manually or mechanically parallel to the direction of the weld. The scanning data of the weak magnetic detection is analyzed and evaluated in accordance with the following criteria.

(1) If the defect identified by the weak magnetic scanning is the same as that of the defect identified by both longitudinal wave and shear wave scanning, or by any single scanning of the PAUT, the PAUT scanning data shall prevail.

(2) For the non-detectable zone, the difficult-to-detect defect, and the acoustic transparency defect during the longitudinal wave scanning and the shear wave scanning of the PAUT, the weak magnetic detection data shall prevail.

Step 5, the five simulated defects in the test piece 3 are detected, and results are analyzed and evaluated.

1. The detection result of the defect 1 #root incomplete penetration.
   (1) The design of the defect 1 #root incomplete penetration is shown in FIG. 22.
   (2) The detection result of the defect 1 #root incomplete penetration.
   1) The result of the longitudinal wave scanning of the PAUT.
   The result of the longitudinal wave scanning of the PAUT shows: the length is 19.6 mm, the depth is 15.4 mm, and the self-height is 2.8 mm.
   2) The result of the shear wave scanning of the PAUT.
   The result of the shear wave scanning of the PAUT shows: the length is 22.6 mm, the depth is 14.7 mm, and the self-height is 2.5 mm.
   3) The result of the weak magnetic testing.
   The incomplete penetration defect is also identified by the weak magnetic detection at this position, and the length is approximately 18 mm.
   4) Comprehensive evaluation.
   According to the evaluation criteria, if the defect is identified by both the PAUT and the weak magnetic detection, the detection result of the PAUT shall prevail. The result of the PAUT is evaluated comprehensively. Therefore, the final detection result of the defect 1 #root incomplete penetration shows: the length is 19.6 mm, the depth is 15.4 mm, and the self-height is 2.5 mm.

2. The detection result of the defect 2 #slag inclusion.
   (1) The design of the defect 2 #slag inclusion is shown in FIG. 22.
   (2) The detection result of the defect 2 #slag inclusion.
   1) The result of the longitudinal wave scanning of the PAUT.
   The result of the longitudinal wave scanning of the PAUT shows: the length is 20 mm, the depth is 8.9 mm, and the self-height is 2.0 mm.
   2) The result of the shear wave scanning of the PAUT.
   The result of the shear wave scanning of the PAUT shows: the length is 25.6 mm, the depth is 4.1 mm, and the self-height is 3 mm.
   (3) The result of the weak magnetic detection.
   The slag inclusion defect is also identified by the weak magnetic detection at this position, and the length is approximately 25 mm.
   4) Comprehensive evaluation.
   According to the evaluation criteria, if the defect is identified by both the PAUT and the weak magnetic detection, the result evaluation is based on the result of the PAUT. The result of the PAUT is evaluated comprehensively. Accordingly, the final detection result of the defect 2 #slag inclusion shows: the length is 20 mm, the depth is 8.9 mm, and the self-height is 3 mm.

3. The detection result of the defect 3 #surface non-opening crack.
   (1) The design of the defect 3 #surface non-opening crack is shown in FIG. 24.
   (2) The detection result of the defect 3 #surface non-opening crack.
   1) The result of the longitudinal wave scanning of the PAUT.
   The result of the longitudinal wave scanning of the PAUT shows: the length is 19.4 mm, the depth is 4.4 mm, and the self-height is 4.1 mm.
   2) The result of the shear wave scanning of the PAUT.
   The result of the shear wave scanning of the PAUT shows: the length is 5.1 mm, the depth is 2.5 mm, and the self-height is 2.4 mm.
   (3) The result of the weak magnetic detection.
   The surface non-opening crack defect is also detected by the weak magnetic detection at this position, and the length of the surface non-opening crack defect is approximately 22 mm.
   4) Comprehensive evaluation.
   According to the evaluation criteria, if the defect is identified by both the PAUT and the weak magnetic detection, the detection result of the PAUT shall prevail. The result of the PAUT is evaluated comprehensively. Therefore, the final detection result of the defect 3 #surface non-opening crack shows: the length is 19.4 mm, the depth is 4.4 mm, and the self-height is 4.1 mm.

4. The detection result of the defect 4 #porosity.
   (1) The design of the defect 4 #porosity is shown in FIG. 25.
   (2) The detection result of the defect 4 #porosity.
   1) The result of the longitudinal wave scanning of the PAUT.
   The result of the longitudinal wave scanning of the PAUT shows: the length is 5.7 mm, and the depth is 3 mm.
   2) The result of the shear wave scanning of the PAUT.
   The result of the shear wave scanning of the PAUT shows: the length is 2.7 mm and the depth is 4 mm.
   (3) The result of the weak magnetic detection
   The porosity defect is also identified by the weak magnetic detection at this position, and the length is approximately 6 mm. Meanwhile, in the vicinity of the porosity defect, a indication with a length of approximately 10 mm at a distance of about 382 mm from the position of the scanning start point is identified by the weak magnetic detection.
   (4) Comprehensive evaluation
   According to the evaluation criteria, if the defect is identified by both the PAUT and the weak magnetic detection, the detection result of the PAUT shall prevail. If the defect is not identified by the PAUT scanning but identified by the weak magnetic detection, the defect is evaluated comprehensively.
   For the above mentioned 10 mm in length indication, it is evaluated comprehensively as follows: firstly, this indication cannot be failed to be identified be PAUT. Since the pipe wall thickness is 16 mm which is not a thick one, and the diameter of the pipe is 159 mm, PAUT probe scanning can be freely performed on two sides of the weld which making no undetectable zone existing. Moreover, the probe can be scanned in a direction a little bit incline to the weld direction, by which transverse cracking defects can also be identified. Secondly, this indication cannot be evaluated as the acoustic transparency defect, as both longitudinal wave scanning and shear wave scanning are applied while PAUT scanning, the acoustic transparency defect cannot be omitted by such scanning due to different velocity and wavelength between longitudinal wave and shear wave. Thirdly, this indication can also be excluded from the judgement of external irregular shaping due to visual inspection acceptance. This indication can be tentatively determined an interference signal due to the internal irregular shaping at root reinforcement. Then after go back to the PAUT scanning data, no defect signal can be found in this location, which is furtherly confirmed that this 10 mm length indication identified by weak magnetic detection is not a real defect, but an interference signal due to the internal irregular shaping at root reinforcement.

The final result is based on the evaluation of the PAUT scanning data. Therefore, the final detection result of the defect 4 #porosity shows: the length is 5.7 mm and the depth is 3 mm.

5. The detection result of the defect 5 #lack of side fusion.
  (1) The design of the defect 5 #lack of side fusion is shown in FIG. 26.
  (2) The detection result of the defect 5 #lack of side fusion.
  1) The result of the longitudinal wave scanning of the PAUT.
  The result of the longitudinal wave scanning of the PAUT shows: the length is 24.3 mm, the depth is 4.7 mm, and the self-height is 2.4 mm.
  2) The result of the shear wave scanning of the PAUT.
  The result of the shear wave scanning of the PAUT shows: the length is 16.2 mm, the depth is 5.3 mm, and the self-height is 2.4 mm.
  (3) The result of the weak magnetic detection.
  The lack of side fusion is also identified by the weak magnetic detection, and the length is approximately 20 mm.
  4) Comprehensive evaluation.
  According to the evaluation criteria, if the defect is identified by both the PAUT and the weak magnetic detection, the scanning result of the PAUT shall prevail. The result of the PAUT is evaluated comprehensively. Therefore, the final detection result of the defect 5 #lack of side fusion shows: the length is 16.2 mm, the depth is 5.3 mm, and the self-height is 2.4 mm.

Embodiment 4

Figure 27:
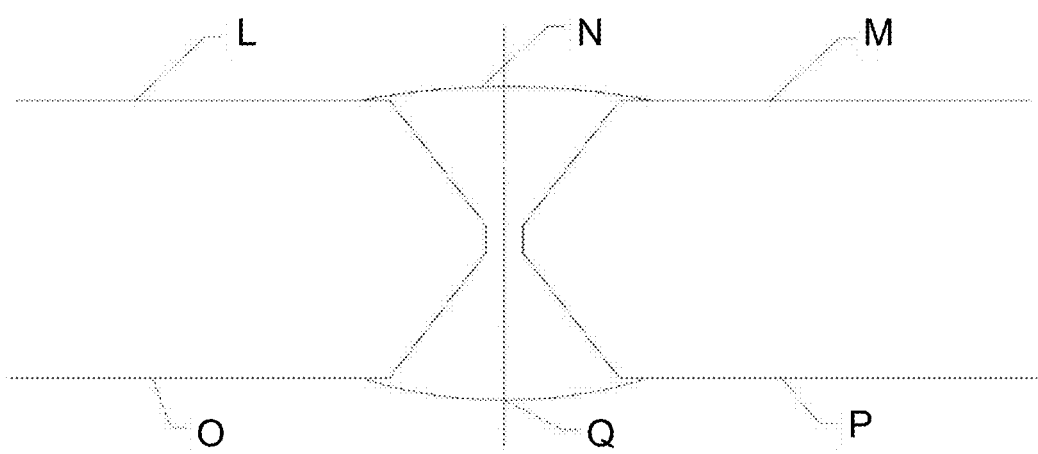
FIG. 27 is a schematic diagram illustrating an X-shaped groove butt weld configuration in Embodiment 4.
Figure 28:
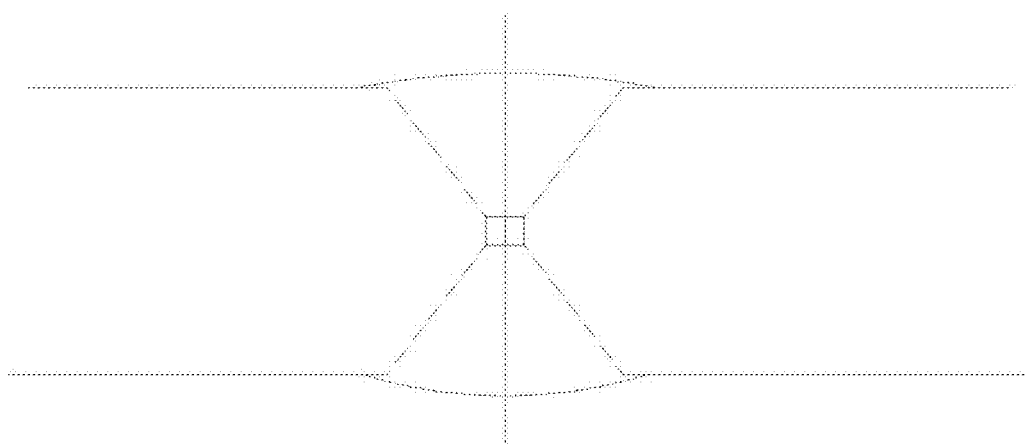
FIG. 28 is a schematic diagram illustrating a design of defect 2 #root incomplete penetration in Embodiment 4.

A test plate butt weld simulated defect test piece 4 is detected in Embodiment 4. The test plate butt weld is formed by the material Q345R with specifications of 300 mm×300 mm×30 mm, and the groove form is an X shape. As shown in FIG. 27, the groove parameters are as follows: the bevel angle is 30°, the height of the filling zone is 13.5 mm, the height of the root face is 2 mm, and the thickness of the workpiece is 30 mm. Two defects are fabricated in the test plate butt weld, i.e., the defect 1 #interior crack (design parameters include: the length is 51 mm, the depth is 8.5 mm, the self-height is 5.0+1 mm, and the position is 5 mm-101 mm), and the defect 2 #root incomplete penetration (design parameters include: the length is 45+5 mm, the depth is 13.5+1 mm, the self-height is 3+1 mm, and the position is 252 mm-300 mm). The defect 2 #root incomplete penetration is an acoustic transparency defect, and the size of the defect is shown in FIG. 28, which is taken as an example. The analysis of other defects is similar to the above, which is not repeated here. The test plate uses the welding technique of two-side welding. The scanning surface includes two surfaces and two sides of the test plate and the weld (i.e., L-side, M-side, N-side, O-side, P-side, and Q-side). The applied NDT methods include PAUT sector scanning, radiographic testing (RT), TOFD, and the weak magnetic detection.

Step 1, an inspection approach for a butt weld simulated defect test piece 4 is determined.

Figure 29:
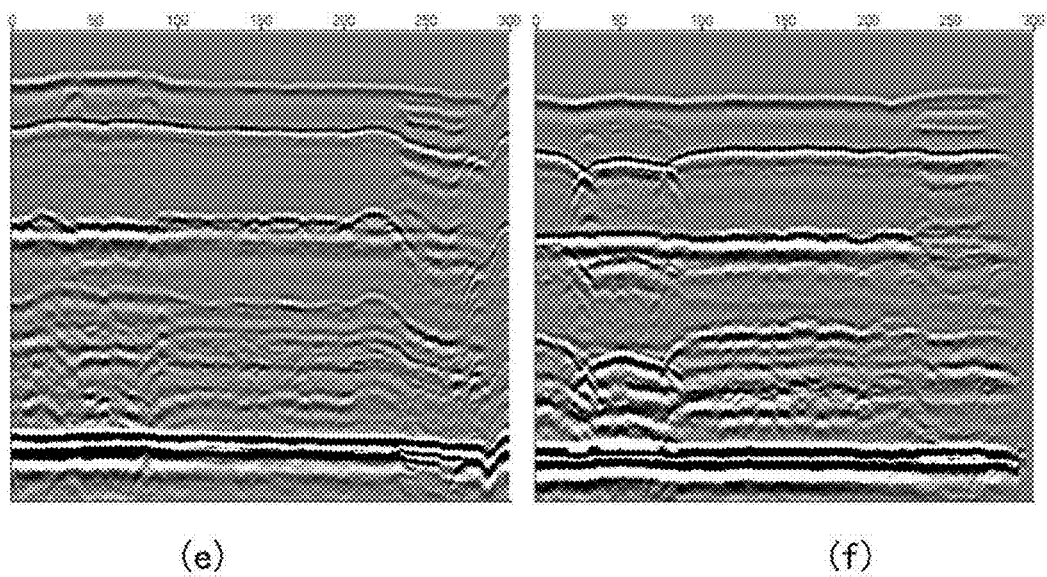
FIG. 29 is the TOFD detection results when a welding thickness is in a range of 15-18 mm in Embodiment 4, where (e) is scanned from the front side, and (f) is scanned from the back side.
Figure 30:
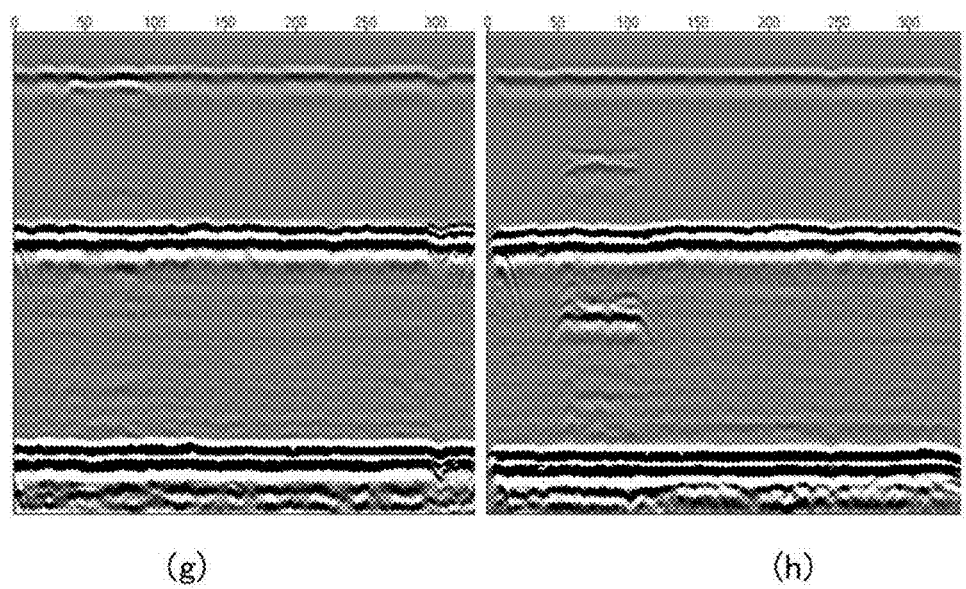
FIG. 30 is the TOFD detection results when a welding thickness is 30 mm in Embodiment 4, where (g) is scanned from the front side, and (h) is scanned from the back side.

The NDT methods, include RT, the TOFD, the PAUT, and the weak magnetic detection will be applied to the butt weld simulated defect test piece 4.
  Step 2, the test piece is subject to different NDT methods to verify the acoustic transparency phenomenon of the defect 2 #root incomplete penetration. Based on the comparison, find the optimal solution to the problem of acoustic transparency defect.
  1. RT detection.
  As the test piece is 30 mm in thickness, which is above the most suitable thickness range by radiographic testing, therefore RT is performed when the welding completed at the wall thickness approximately 15 mm-18 mm to achieve a better image indication of the defects, and also witness the existing of the defect 2 #root incomplete penetration. The detection result shows: the length of the defect 1 #interior crack is 54 mm, the width of the defect 1 #interior crack is 0.4 mm, the length of the defect 2 #root incomplete penetration is 44 mm, and the width of the defect 2 #root incomplete penetration is 0.3 mm.
  When the welding completed with the whole thickness of 30 mm, the RT is repeated and, on the radiography, it shows that the defect 1 #interior crack and the defect 2 #root incomplete penetration are failed to be identified.
  2. TOFD detection.
  (1) When the weld completed at the thickness 15 mm-18 mm, TOFD is applied and the scanning results are shown in FIG. 29. The details are as follows:
  The detection result by TOFD of the defect 1 #interior crack shows: the length is 49.6 mm, and the depth is approximately 6 mm. The detection result of the defect 2 #root incomplete penetration shows: the length is 40.6 mm, the depth is approximately 12.8 mm, and the self-height is 2.9 mm.
  (2) When the welding completed with the whole thickness of 30 mm, the detection results of the TOFD are shown in FIG. 30.
  The detection result by TOFD of the defect 1 #interior crack shows: the length is 51.8 mm, the depth is approximately 6.2 mm, and the self-height is 3.9 mm.
  The detection result by TOFD of the defect 2 #root incomplete penetration is failed to be identified. The root incomplete penetration defect shows the phenomenon of acoustic transparency.
  (3) As shown in FIG. 29 and FIG. 30, the root incomplete penetration defect does exist, but it failed to be identified by TOFD scanning after the whole weld completed due to the acoustic transparency phenomenon.
  3. Detecting by shear wave scanning of the PAUT.
  The result of the PAUT shows:
  For the defect 1 #interior crack, the length is 50 mm, the depth is 22.4 mm (detection from back side, if detect from the frontside, the depth is 7.6 mm), the amplitude is DAC+5.2 dB, and the self-height is 5.0 mm.
  The detection result of the defect 2 #root incomplete penetration shows: the length is 9 mm, the depth is 16.8 mm, the amplitude is DAC-0.6 dB, and the self-height is 3.4 mm.
  The actual length of the root incomplete penetration defect is about 40 mm, and only 9 mm is identified by the PAUT scanning, which is less than a quarter of the actual length and with a low amplitude signal. From the perspective of defect indeterminacy, the defect is qualified, or misses detection, which leads to misjudgment. From the qualitative perspective, the defect is unqualified.
  4. The weak magnetic detection is adopted for detection.
  If the simulated defect test piece 4 is scanned by the weak magnetic detection device, the defect 1 #interior crack and the defect 2 #root incomplete penetration can be easily identified, especially the defect 2 #root incomplete penetration, with the length about 50 mm. For the detection of defects with characteristics of acoustic transparency, the weak magnetic detection technique is more sensitive than RT, TOFD and PAUT.

5. Comprehensive evaluation.

In summary, it is very easy to identify and display the defect 1 #interior crack and the defect 2 #root incomplete penetration in the test piece 4 if the weak magnetic detection device employed. The defect 2 #root incomplete penetration can be determined the "acoustic transparency" defect based on the results of RT, TOFD, PAUT, and weak magnetic detection. This case indicates that the weak magnetic detection has significant advantages while scanning the acoustic transparency defect, far surpassing RT, TOFD, and PAUT.

Therefore, the present disclosure provides the method for detecting the austenitic weld based on the ultrasonic-magnetic combination technique. By taking the advantages of the PAUT technique and the unique characteristics of the weak magnetic detection technique, the integration of these two detection methods addresses the issues such as missed detection, incomplete coverage, and the inability to detect defects where using ultrasonic method for detecting the austenitic weld, thereby providing technical assurance for the application of austenitic stainless steel materials in high-end equipment and large-scale projects.

The above embodiments are only used to illustrate the technical solutions of the present disclosure rather than to limit it. Although the present disclosure is described in detail with reference to preferred embodiments, it should be understood by those having ordinary skills in the art that modifications or equivalent substitutions may be made to the technical solutions of the present disclosure, and such modifications or equivalent substitutions shall not cause the modified technical solutions to deviate from the spirit and scope of the technical solutions of the present disclosure.

What is claimed is:

1. A method for detecting an austenitic weld based on an ultrasonic-magnetic combination, comprising:
   step 1, dividing the austenitic weld into a plurality of zones along a thickness direction to obtain divided zones;
   step 2, detecting the divided zones based on the ultrasonic-magnetic combination; wherein the ultrasonic-magnetic combination is a combination of phased array ultrasonic testing (PAUT) and weak magnetic detection, the PAUT including longitudinal wave scanning and shear wave scanning;
   wherein the detecting the divided zones based on the ultrasonic-magnetic combination includes:
   determining priorities of the PAUT and the weak magnetic detection based on a position of each of the zones, defect type, and a position of a zone in which a defect is located, wherein
      the PAUT includes controlling a PAUT device to adopt non-parallel scan detection or manual zigzag scan detection; wherein the non-parallel scan detection refers to scan detection using a probe of the PAUT device by moving parallel to a direction of the austenitic weld; and the PAUT device is provided with an encoder;
      the weak magnetic detection includes a manual scan or a mechanical scan, wherein the mechanical scan refers to using a probe of a weak magnetic detection device close to a surface of the austenitic weld by moving parallel to the direction of the austenitic weld, wherein the weak magnetic detection device is provided with the encoder;
   step 3, controlling the PAUT device to perform the PAUT on the divided zones using phased array probe parameters or controlling the weak magnetic detection device to perform the weak magnetic detection on the divided zones, based on the priorities of the PAUT and the weak magnetic detection, including:
   during the PAUT, performing the weak magnetic detection for a non-detectable zone, a difficult-to-detect defect, and an acoustic transparency defect, wherein
      the non-detectable zone for PAUT scanning is defined as a zone that is not detected due to at least one of a structural limitation of an object to be inspected and/or limitations of the applied detection methods;
      the difficult-to-detect defect is a transverse defect of which direction is parallel or approximately parallel to a phased array ultrasonic beam, and
      the acoustic transparency defect includes defects through which ultrasonic waves penetrate without reflection at an interface; and
   during the weak magnetic detection, performing the PAUT for zones where confusion defect signals and geometric interference signals appear, wherein
      the confusion defect signals are generated in situations where two defects with same position but different thicknesses are confused, or a large defect is displayed as a plurality of defects, and
      the geometric interference signals are generated by geometrical shapes.

2. The method of claim 1, wherein the PAUT device is configured to provide multiple scanning modes and zone discrimination scanning;
   a number of wafers used to generate ultrasonic beams of the probe of the PAUT device is no less than 16; and
   a number of channels of the weak magnetic detection device is no less than two.

3. The method of claim 1, further comprising:
   performing a comprehensive evaluation on a defect identified by both the longitudinal wave scanning and the shear wave scanning of the PAUT.

4. The method of claim 1, wherein the method is applicable to detection of welds of coarse grain materials, composite plates, and carbon steel.

5. The method of claim 2, wherein the multiple scanning modes include sector scanning, linear scanning, and spiral scanning.

6. The method of claim 1, wherein the probe of the PAUT device is a linear array probe or an area array probe.

7. The method of claim 3, wherein
   the shear wave scanning is configured to detect a fusion line defect, the fusion line defect including a lack of side fusion and an external toe crack;
   the longitudinal wave scanning is configured to detect volumetric defects inside the zones, the defects inside the zones including a porosity, a slag inclusion, and a centerline crack.

8. The method of claim 7, wherein the performing a comprehensive evaluation on a defect identified by both the longitudinal wave scanning and the shear wave scanning of the PAUT comprises:
   evaluating the fusion line defect based on shear wave scanning data; and
   evaluating a defect inside the austenitic weld based on longitudinal wave scanning data.

9. The method of claim 1, further comprising:
performing an evaluation on defects of the object to be inspected based on weak magnetic scanning data and PAUT scanning data, including:
in response to a defect in the weak magnetic scanning data being same as a defect in the PAUT scanning data, evaluating the defect based on the PAUT scanning data;
in response to the non-detectable zone, the difficult-to-detect defect, and the acoustic transparency defect existing during the PAUT, evaluating the non-detectable zone, the difficult-to-detect defect, and the acoustic transparency defect based on the weak magnetic scanning data.

* * * * *

UNITED STATES PATENT AND TRADEMARK OFFICE
CERTIFICATE OF CORRECTION

PATENT NO. : 12,455,266 B1  
APPLICATION NO. : 19/178976  
DATED : October 28, 2025  
INVENTOR(S) : Sen Tian et al.

Page 1 of 1

It is certified that error appears in the above-identified patent and that said Letters Patent is hereby corrected as shown below:

On the Title Page

Item (71)Applicant: "HULUDAO BEIJIAN TECHNOLOGY CO., LTD., Liaoning (CN)" should read --HULUDAO BEIJIAN TECHNOLOGY CO., LTD., Huludao (CN)--

Item (73) Assignee: "HOLUDAO BEIJIAN TECHNOLOGY CO., LTD., Huludao (CN)" should read --HULUDAO BEIJIAN TECHNOLOGY CO., LTD., Huludao (CN)--

Signed and Sealed this  
Ninth Day of December, 2025

John A. Squires  
*Director of the United States Patent and Trademark Office*